United States Patent
Silvi et al.

(10) Patent No.: US 6,790,929 B2
(45) Date of Patent: Sep. 14, 2004

(54) METHOD FOR MAKING AN AROMATIC POLYCARBONATE

(75) Inventors: Norberto Silvi, Clifton Park, NY (US); Mark Howard Giammattei, Selkirk, NY (US); Patrick Joseph McCloskey, Watervliet, NY (US); Alberto Nisoli, Niskayuna, NY (US); James Day, Scotia, NY (US); Narayan Ramesh, Niskayuna, NY (US); Paul Michael Smigelski, Jr., Schenectady, NY (US); Paul Russell Wilson, Latham, NY (US)

(73) Assignee: General Electric Company, Niskayuna, NY (US)

( * ) Notice: Subject to any disclaimer, the term of this patent is extended or adjusted under 35 U.S.C. 154(b) by 177 days.

(21) Appl. No.: 10/389,009

(22) Filed: Mar. 17, 2003

(65) Prior Publication Data

US 2003/0236384 A1 Dec. 25, 2003

Related U.S. Application Data

(63) Continuation-in-part of application No. 10/167,901, filed on Jun. 12, 2002.

(51) Int. Cl.$^7$ .............................................. C08G 64/00
(52) U.S. Cl. .................... 528/198; 264/176.1; 264/219; 528/196; 422/131
(58) Field of Search ............................. 264/176.1, 219; 422/131; 528/196, 198

(56) References Cited

U.S. PATENT DOCUMENTS

| | | | |
|---|---|---|---|
| 4,323,668 A | 4/1982 | Brunelle | |
| 5,696,222 A | 12/1997 | Kaneko et al. | |
| 6,300,459 B1 | 10/2001 | Kaneko et al. | |
| 6,339,109 B1 | 1/2002 | Day et al. | |
| 6,420,512 B1 | 7/2002 | McCloskey et al. | |
| 6,506,781 B1 | 1/2003 | Cobb et al. | |

FOREIGN PATENT DOCUMENTS

| | | |
|---|---|---|
| EP | 0738579 | 10/1996 |
| EP | 0976772 | 2/2000 |
| EP | 980861 | 2/2000 |
| EP | 1114841 | 7/2001 |
| EP | 1191049 | 3/2002 |
| WO | WO02060855 | 8/2002 |

*Primary Examiner*—Terressa Boykin
(74) *Attorney, Agent, or Firm*—Andrew J. Caruso; Patrick K. Patnode

(57) ABSTRACT

This invention relates to an extrusion method preparing polycarbonates from a solution of an oligomeric polycarbonate. A mixture of bis(methyl salicyl)carbonate (BMSC), BPA and a transesterification catalyst are first equilibrated at moderate temperatures to provide a solution of polycarbonate oligomer in methyl salicylate. The solution is then fed to a devolatilizing extruder, where the polymerization reaction is completed and the methyl salicylate solvent is removed. The solution comprising the oligomeric polycarbonate can also be pre-heated under pressure to a temperature above the boiling point of methyl salicylate and subsequently fed to a devolatilizing extruder equipped for rapid flashing off the solvent. The method provides polycarbonate with greater efficiency than the corresponding process in which unreacted monomers are fed to the extruder. Additionally, the method of the invention does not require the isolation of a precursor polycarbonate comprising ester-substituted phenoxy terminal groups.

58 Claims, 3 Drawing Sheets

METHOD FOR MAKING AN AROMATIC POLYCARBONATE

RELATED APPLICATION

This application is a continuation-in-part of copending U.S. application Ser. No. 10/167,901 filed Jun. 12, 2002 which is incorporated herein by reference.

BACKGROUND OF THE INVENTION

This invention relates to a method of preparing polycarbonate. More particularly the method relates to a method whereby a solution comprising a solvent and an oligomeric polycarbonate is introduced into a devolatilizing extruder wherein the oligomeric polycarbonate is converted into high molecular weight polycarbonate while simultaneously removing the solvent. More particularly, the instant invention relates to the formation under mild conditions of polycarbonates having extremely low levels of Fries rearrangement products, a high level of endcapping and low levels of residual solvent.

Polycarbonates, such as bisphenol A polycarbonate, are typically prepared either by interfacial or melt polymerization methods. The reaction of a bisphenol such as bisphenol A (BPA) with phosgene in the presence of water, a solvent such as methylene chloride, an acid acceptor such as sodium hydroxide and a phase transfer catalyst such as triethylamine is typical of the interfacial methodology. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chloride content, which can cause corrosion.

The melt method, although obviating the need for phosgene or a solvent such as methylene chloride requires high temperatures and relatively long reaction times. As a result, by-products may be formed at high temperature, such as the products arising by Fries rearrangement of carbonate units along the growing polymer chains. Fries rearrangement gives rise to undesired and uncontrolled polymer branching which may negatively impact the polymer's flow properties and performance. The melt method further requires the use of complex processing equipment capable of operation at high temperature and low pressure, and capable of efficient agitation of the highly viscous polymer melt during the relatively long reaction times required to achieve high molecular weight.

Some years ago, it was reported in U.S. Pat. No. 4,323,668 that polycarbonate could be formed under relatively mild conditions by reacting a bisphenol such as BPA with the diaryl carbonate formed by reaction phosgene with methyl salicylate. The method used relatively high levels of transesterification catalysts such as lithium stearate in order to achieve high molecular weight polycarbonate. High catalyst loadings are particularly undesirable in melt polycarbonate reactions since the catalyst remains in the product polycarbonate following the reaction. The presence of a transesterification catalyst in the polycarbonate may shorten the useful life span of articles made therefrom by promoting increased water absorption, polymer degradation at high temperatures and discoloration.

In copending U.S. applications Ser. Nos. 09/911,439 and 10/167903, now issued as U.S. Pat. Nos. 6,420,512 and 6,506,871 respectively, extrusion of a mixture of an ester-substituted diaryl carbonate, such as bis-methyl salicyl carbonate, a dihydroxy aromatic compound, such as bisphenol A, and a transesterification catalyst, such as tetrabutylphosphonium acetate (TBPA), afforded high molecular weight polycarbonate. The extruder employed was equipped with one or more vacuum vents to remove by-product ester-substituted phenol. Similarly, a precursor polycarbonate having ester-substituted phenoxy endgroups, for example methyl salicyl endgroups, when subjected to extrusion afforded a polycarbonate having a significantly increased molecular weight relative to the precursor polycarbonate. The reaction to form a higher molecular weight polycarbonate may be catalyzed by residual transesterification catalyst present in the precursor polycarbonate, or by a combination of any residual catalyst and an additional catalyst such as TBPA introduced in the extrusion step. Fries rearrangement products were not observed in the product polycarbonates.

Although the methods described in copending U.S. application Ser. Nos. 09/911,439 and 10/167,903 (now issued as U.S. Pat. Nos. 6,420,512 and 6,506,871 respectively) represent significant enhancements in the preparation of polycarbonate relative to older methods, additional improvements are needed. For example, it would be highly desirable to increase the throughput rate of starting materials through the extruder in order to achieve greater efficiency. In addition, it would be highly desirable to avoid having to isolate a precursor polycarbonate having ester-substituted phenoxy endgroups prior to its extrusion to afford a higher molecular weight polycarbonate.

BRIEF SUMMARY OF THE INVENTION

The present invention provides a method for the preparation of polycarbonate, said method comprising extruding in the presence of a transesterification catalyst at one or more temperatures in a temperature range between about 100° C. and about 400° C. a solution comprising a solvent and an oligomeric polycarbonate, said extruding being carried out on an extruder equipped with at least one vent adapted for solvent removal, said oligomeric polycarbonate comprising polycarbonate repeat units derived from at least one dihydroxy aromatic compound, said oligomeric polycarbonate comprising ester substituted phenoxy terminal groups having structure I

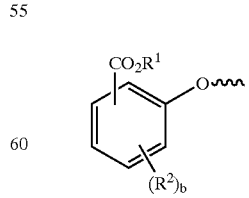

I wherein $R^1$ is a $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

The present invention further relates to a method for preparing solutions comprising an ester substituted phenol solvent and an oligomeric polycarbonate, and the conversion of said oligomeric polycarbonate into high molecular weight polycarbonate with simultaneous removal said solvent, said method comprising:

Step (I) heating a mixture comprising at least one dihydroxy aromatic compound, an ester substituted diaryl carbonate and a transesterification catalyst at a temperature in a range between about 100° C. and about 300° C. to provide a solution of an oligomeric polycarbonate in an ester substituted phenol solvent; and step (II) extruding said solution of oligomeric polycarbonate in said ester substituted phenol at one or more temperatures in a range between about 100° C. and about 400° C., and at one or more screw speeds in a range between about 50 and about 1200 rpm, said extruding being carried out on an extruder comprising at least one vent adapted for solvent removal.

In another aspect the present invention relates to a polycarbonate prepared according to the method of the invention, said polycarbonate having a very high level of endcapping, a very low level of Fries product, and a very low level of residual solvent.

DETAILED DESCRIPTION OF THE INVENTION

Figure 1:
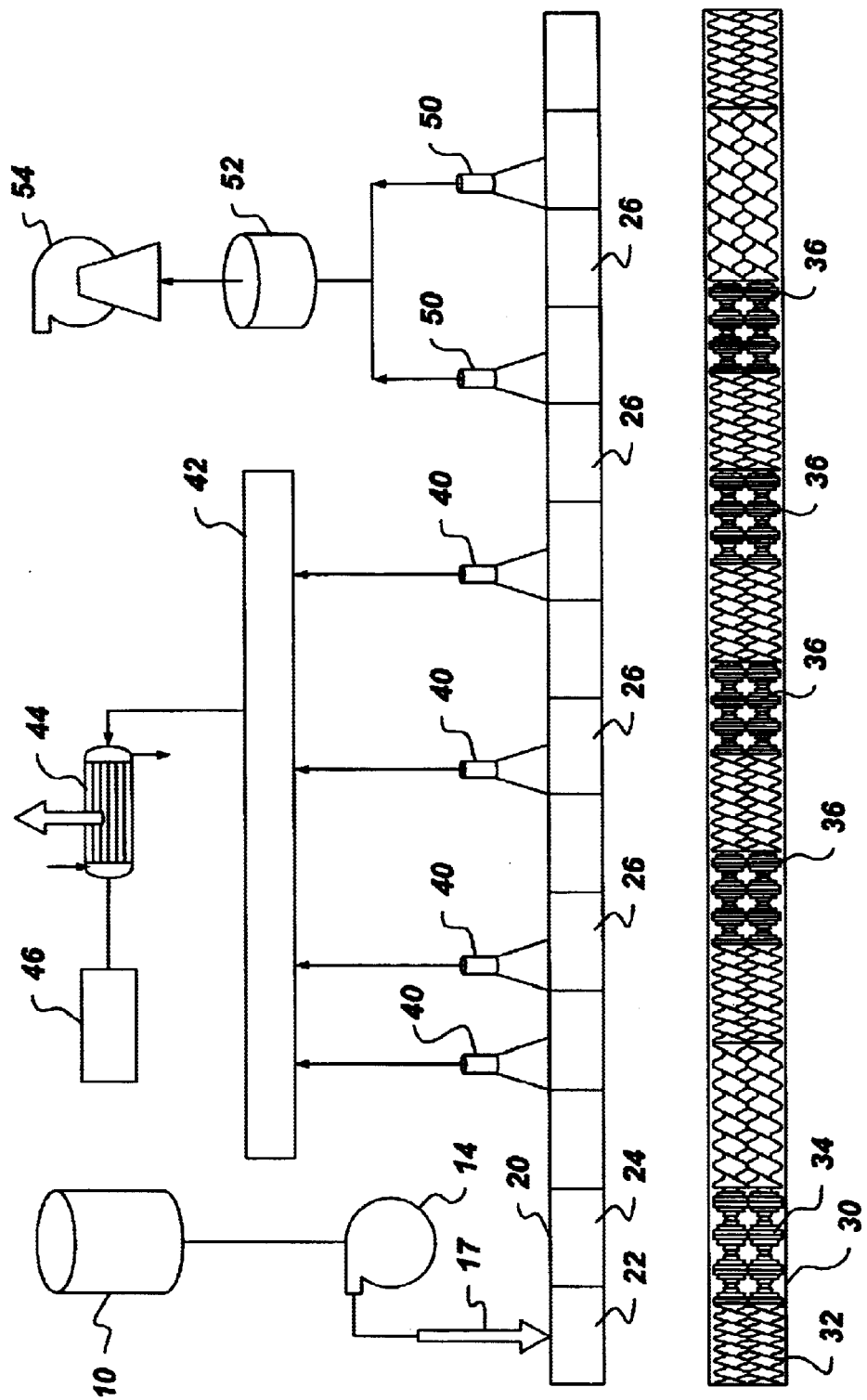
FIG. 1 illustrates a devolatilizing extruder and feed system suitable for use according to the method of the present invention.

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "oligomeric polycarbonate" refers to a polycarbonate oligomer having a number average molecular weight of less than 5000 daltons and includes oligomeric polycarbonates comprising polycarbonate repeat units derived from one or more dihydroxy aromatic compounds.

As used herein, when describing an oligomeric polycarbonate, the expression "polycarbonate repeat units derived from at least one dihydroxy aromatic compound" means a repeat unit-incorporated into an oligomeric polycarbonate by reaction of a dihydroxy aromatic compound with a source of carbonyl units, for example the reaction of bisphenol A with bis(methyl salicyl)carbonate.

As used herein, the term "high molecular weight polycarbonate" means polycarbonate having a number average molecular weight, $M_n$, of 8000 daltons or more.

As used herein, the term "solvent" can refer to a single solvent or a mixture of solvents.

As used herein, the term "solution comprising a solvent and an oligomeric polycarbonate" refers to a liquid comprising an oligomeric polycarbonate, said liquid comprising at least 10 percent by weight solvent.

As used herein, the term "melt polycarbonate" refers to a polycarbonate made by the transesterification of a diaryl carbonate with a dihydroxy aromatic compound.

"BPA" is herein defined as bisphenol A or 2,2-bis(4-hydroxyphenyl)propane.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

The terms "double screw extruder" and "twin screw extruder" are used interchangeably herein.

As used herein the term "monofunctional phenol" means a phenol comprising a single reactive hydroxy group.

The terms "vent port" and "vent" are used interchangeably herein.

The term "atmospheric vent" as used herein is meant to indicate a vent which is operated at or near atmospheric pressure. Thus, an atmospheric vent being operated under a slight vacuum, such as that commonly designated "house vacuum", is meant to fall within the ambit of the term "atmospheric vent".

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group. Aromatic radicals are further illustrated by radicals which comprise both aromatic and cycloaliphatic structural components. For example, the radical 4-cyclohexylphenyl is ranked herein as an aromatic rather than a cycloaliphatic radical.

As used herein the term "cycloaliphatic radical" refers to a radical having a valence of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl, cyclohexyl, tetrahydrofuranyl and the like.

The present invention provides a method of preparing polycarbonates whereby a solution comprising an oligomeric polycarbonate in a solvent, said oligomeric polycarbonate comprising ester substituted phenoxy endgroups having structure I, is extruded through an extruder adapted to remove solvent. The method of the invention effects both the conversion of the oligomeric polycarbonate to a product polycarbonate having higher molecular weight, and a separation of the solvent initially present in the solution of the oligomeric polycarbonate from the product polycarbonate. Additionally, the method provides for the removal of other volatile materials which may be present in the initial solution of oligomeric polycarbonate, or formed as by-products as the oligomeric polycarbonate is transformed in the extruder to the product polycarbonate.

The oligomeric polycarbonate comprises polycarbonate repeat units and terminal phenoxy endgroups having structure I. Terminal phenoxy endgroups having structure I include ester substituted phenoxy endgroups generally. Ester substituted phenoxy engroups are exemplified by the 2-ethoxycarbonylphenoxy group, 2-propoxycarbonylphenoxy group, 4-chloro-2-methoxycarbonylphenoxy group, and the 4-cyano-2-methoxycarbonylphenoxy group. Among the various ester substituted phenoxy terminal groups, the 2-methoxycarbonylphenoxy group II is frequently preferred.

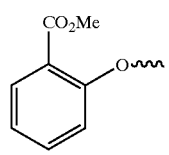

II

The oligomeric polycarbonate comprises repeat units derived from at least one dihydroxy aromatic compound. Dihydroxy aromatic compounds are illustrated by dihydroxy benzenes, for example hydroquinone (HQ), 2-methylhydroquinone, resorcinol, 5-methylresorcinol and the like; dihydroxy naphthalenes, for example 1,4-dihydroxynathalene, 2,6-dihydroxynaphthalene, and the like; and bisphenols, for example bisphenol A and 4,4'-sulfonyldiphenol. The oligomeric polycarbonate typically contains polycarbonate repeat units derived from at least one bisphenol, said polycarbonate repeat units having structure III

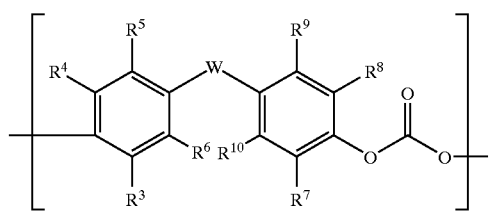

wherein $R^3$–$R^{10}$ are independently a hydrogen atom, halogen atom, nitro group, cyano group, $C_1$-$C_{20}$ alkyl group, $C_4$-$C_{20}$ cycloalkyl group, or $C_6$-$C_{20}$ aryl group; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

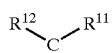

wherein $R^{11}$ and $R^{12}$ are independently a hydrogen atom, $C_1$-$C_{20}$ alkyl group, $C_4$-$C_{20}$ cycloalkyl group, or $C_4$-$C_{20}$ aryl group; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$cycloalkyl groups, or a combination thereof.

Repeat units having structure III are illustrated by repeat units present in bisphenol A polycarbonate, bisphenol M polycarbonate, bisphenol C polycarbonate, and the like.

In one embodiment of the present invention the oligomeric polycarbonate comprises repeat units having structure IV

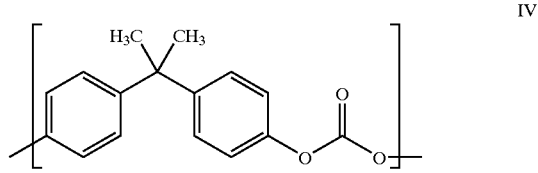

IV said repeat units IV being derived from bisphenol A. In an alternate embodiment of the present invention the oligomeric polycarbonate comprises repeat units having structures IV and V

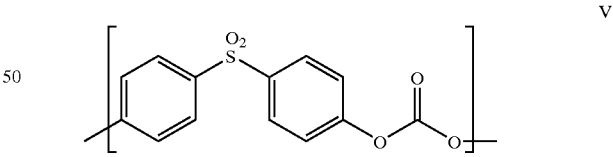

V said repeat units V being derived from 4,4'-sulfonyldiphenol.

The solution of the oligomeric polycarbonate used according to the method of the present invention comprises at least one solvent. The solvent may be a single solvent or a mixture of solvents. Typically the solvent present in the solution of the oligomeric polycarbonate comprises from about 10 percent by weight to about 99 percent by weight, preferably from about 10 percent by weight to about 70 percent by weight of the solution. For example a solution of oligomeric bisphenol A polycarbonate comprising phenoxy endgroups II dissolved in methyl salicylate, said solution being about 40 percent by weight of said oligomeric polycarbonate and about 60 percent by weight methyl salicylate. Alternatively the solution may comprise more than one solvent, for example a solution of oligomeric bisphenol A polycarbonate comprising phenoxy endgroups II dissolved in a mixture of ortho-dichlorobenzene (ODCB) and methyl salicylate, said solution being about 40 percent by weight of said oligomeric polycarbonate, 30 percent by weight ODCB, and about 30 percent by weight methyl salicylate.

In one embodiment of the present invention the solvent employed according to the method of the present invention comprises at least one ester substituted phenol having structure VI

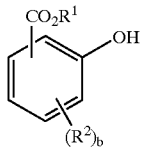
VI wherein $R^1$, $R^2$, and b are defined as in structure I. Examples of ester-substituted phenols having structure VI include methyl salicylate, ethyl salicylate, butyl salicylate, 4-chloro methyl salicylate, and mixtures thereof. Solvent VI may be recovered and reused. For example, ester substituted phenols such as VI may be recovered, purified, and reacted with phosgene to make ester substituted diaryl carbonates which in turn can be used to prepare oligomeric polycarbonates comprising terminal phenoxy groups having structure I. Typically, purification of the recovered ester substituted phenol is efficiently carried out by distillation.

The solvent used according to the method of the present invention optionally comprises a halogenated aliphatic solvent, a halogenated aromatic solvent, a non-halogenated aromatic solvent, a non-halogenated aliphatic solvent, or a mixture thereof. Halogenated aromatic solvents are illustrated by ortho-dichlorobenzene (ODCB), chlorobenzene and the like. Non-halogenated aromatic solvents are illustrated by toluene, xylene, anisole, phenol; 2,6-dimethylphenol; and the like. Halogenated aliphatic solvents are illustrated by methylene chloride; chloroform; 1,2-dichloroethane; and the like. Non-halogenated aliphatic solvents are illustrated by ethanol, acetone, ethyl acetate, cyclohexanone, and the like.

In one embodiment of the present invention the solvent employed comprises a mixture of a halogenated aromatic solvent and an ester substituted phenol, for example a mixture of ortho-dichlorobenzene (ODCB) and methyl salicylate.

The transesterification catalyst used according to the present invention may be any catalyst effective in promoting chain growth of the oligomeric polycarbonate during the extrusion. The transesterification catalysts for use according to the method of the present invention may comprise onium catalysts such as a quaternary ammonium compound, a quaternary phosphonium compound, or a mixture thereof.

Quaternary ammonium compounds suitable for use as transesterification catalysts according to the method of the present invention include quaternary ammonium compounds having structure VII

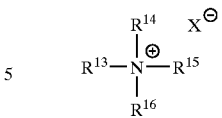
VII wherein $R^{13}$–$R^{16}$ are independently a $C_1$-$C_{20}$ alkyl group, $C_4$-$C_{20}$ cycloalkyl group, or a $C_4$-$C_{20}$ aryl group; and $X^-$ is an organic or inorganic anion.

Quaternary ammonium compounds VII are illustrated by tetamethylammonium hydroxide, tetrabutylammonium acetate, tetrabutylammonium hydroxide, and the like.

Quaternary phosphonium compounds suitable for use as transesterification catalysts according to the method of the present invention include quaternary phosphonium compounds having structure VIII

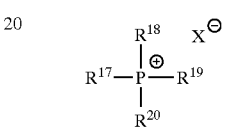
VIII wherein $R^{17}$–$R^{20}$ are independently a $C_1$-$C_{20}$ alkyl group, $C_4$-$C_{20}$ cycloalkyl group, or a $C_4$-$C_{20}$ aryl group; and $X^-$ is an organic or inorganic anion.

Quaternary phosphonium compounds VIII are illustrated by tetramethylphosphonium hydroxide, tetrabutylphosphonium acetate, tetrabutylphosphonium hydroxide, and the like.

In structures VII and VIII, the anion $X^-$ is typically an anion selected from the group consisting of hydroxide, halide, carboxylate, phenoxide, sulfonate, sulfate, carbonate, and bicarbonate. With respect to transesterification catalysts having structures VII and VIII, where $X^-$ is a polyvalent anion such as carbonate or sulfate it is understood that the positive and negative charges in structures VII and VIII are properly balanced. For example, in tetrabutylphosphonium carbonate where $R^{17}$–$R^{20}$ in structure VIII are each butyl groups and $X^-$ represents a carbonate anion, it is understood that $X^-$ represents $\frac{1}{2}(CO_3^{-2})$.

In one embodiment, the transesterification catalyst used is a combination of a quaternary ammonium compound, a quaternary phosphonium compound, or a mixture thereof, with at least one alkali metal hydroxide, alkaline earth metal hydroxide, or a mixture thereof. For example, a mixture of tetrabutylphosphonium acetate and sodium hydroxide.

Other transesterification catalysts that may be used according to the method of the present invention include one or more alkali metal salts of carboxylic acids, one or more alkaline earth salts of a carboxylic acid, and mixtures thereof. Such transesterification catalysts are illustrated by simple salts of carboxylic acids such as sodium acetate, calcium stearate and the like. Additionally, alkali metal and alkaline earth metal salts of organic polyacids may serve as efficient transesterification catalysts according to the method of the present invention. Alkali metal and alkaline earth metal salts of organic polyacids, such as ethylene diamine tetracarboxylate, may be employed. Salts of organic polyacids are illustrated by disodium magnesium ethylenediamine tetracarboxylate ($Na_2Mg$ EDTA).

In one embodiment of the present invention the transesterification catalyst comprises at least one salt of a non-volatile acid. By "non-volatile" it is meant that the acid from which the catalyst is made has no appreciable vapor pressure under melt polymerization conditions. Examples of non-volatile acids include phosphorous acid, phosphoric acid, sulfuric acid, and metal "oxo acids" such as the oxo acids of germanium, antimony, niobium and the like. Salts of non-volatile acids useful as melt polymerization catalysts according to the method of the present invention include alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include $NaH_2PO_3$, $NaH_2PO_4$, $Na_2HPO_4$, $KH_2PO_4$, $CsH_2PO_4$, $Cs_2HPO_4$, $NaKHPO_4$, $NaCsHPO_4$, $KCsHPO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and mixtures thereof.

Typically the transesterification catalyst is employed in an amount corresponding to between about $1.0 \times 10^{-8}$ and about $1 \times 10^{-3}$, preferably between about $1.0 \times 10^{-6}$ and about $2.5 \times 10^{-4}$ moles of transesterification catalyst per mole of polycarbonate repeat units derived from aromatic dihydroxy compound present in the oligomeric polycarbonate.

Typically, the oligomeric polycarbonate employed is prepared in a step involving heating a dihydroxy aromatic compound with an ester substituted diaryl carbonate in the presence of a transesterification catalyst. Thus, the reactants are combined in a vessel in a ratio between about 0.95 and 1.3 moles, preferably between about 1.0 and about 1.05 moles of ester substituted diaryl carbonate per mole of dihydroxy aromatic compound. The amount of transesterification catalyst employed is between about $1.0 \times 10^{-8}$ and about $1 \times 10^{-3}$, preferably between about $1.0 \times 10^{-6}$ and about $2.5 \times 10^{-4}$ moles of transesterification catalyst per mole of dihydroxy aromatic compound employed. Upon heating the mixture at one or more temperatures in a range from about 100° C. to about 400° C., preferably from about 100° C. to about 300° C., and still more preferably from about 100° C. to about 250° C. reaction occurs to produce a solution comprising an equilibrium mixture of product oligomeric polycarbonate, by-product ester substituted phenol (solvent), transesterification catalyst, and low levels of the starting materials, dihydroxy aromatic compound and ester substituted diaryl carbonate. This is referred to as "equilibrating" the reactants. Typically the equilibrium strongly favors the formation of product oligomeric polycarbonate and by-product ester substituted phenol and only traces of the starting materials are observed. The "equilibrated" product mixture may then be introduced into a devolatilizing extruder to effect removal of the by-product ester substituted phenol solvent while converting the oligomeric polycarbonate into a higher molecular weight product polycarbonate. Because, the transesterification catalyst is typically neither consumed in the equilibration step nor removed prior to extrusion, there is typically no need to add additional catalyst during extrusion. Where no additional catalyst is added, the amount of catalyst present during extrusion step (expressed in terms of moles catalyst per mole of polycarbonate repeat units in the oligomeric polycarbonate) will closely approximate the amount of catalyst used in the equilibration step, expressed in moles catalyst per mole dihydroxy aromatic compound.

Typically the ester substituted diaryl carbonate will have structure IX

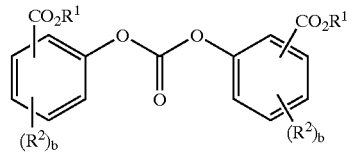

IX wherein $R^1$, $R^2$, and b are defined as in structure I. In addition, the dihydroxy aromatic compound is typically, though not always, at least one bisphenol having structure X

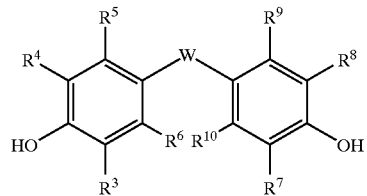

X wherein $R^3$–$R^{10}$ and W are defined as in structure III.

In one embodiment, the method of the present invention comprises:

Step (I) heating a mixture comprising at least one dihydroxy aromatic compound, an ester substituted diaryl carbonate and a transesterification catalyst at a temperature in a range between about 100° C. and about 300° C. to provide a solution of an oligomeric polycarbonate in an ester substituted phenol solvent; and Step (II) extruding said solution of oligomeric polycarbonate in said ester substituted phenol at one or more temperatures in a range between about 100° C. and about 400° C., and at one or more screw speeds in a range between about 50 and about 1200 rpm, said extruding being carried out on an extruder comprising at least one vent adapted for solvent removal.

In some instances it may be desirable to remove a portion of the ester-substituted phenol formed during the equilibration of the monomers. This may be effected conveniently by heating the mixture of monomers and the transesterification catalyst under vacuum, typically from about 0.01 atmospheres to about 0.9 atmospheres, and distilling off a portion of the ester substituted phenol. As ester substituted phenol is distilled from the mixture undergoing the equilibration reaction, the molecular weight of the oligomeric polycarbonate will tend to increase. If sufficient ester substituted phenol by-product is removed, the number average molecular weight ($M_n$) of the polycarbonate product may be in excess of 5000 daltons and in some instances in excess of 8000 daltons. Thus, in one aspect of the present invention a mixture comprising at least dihydroxy aromatic compound is reacted with at least one ester substituted diaryl carbonate in the presence of a transesterification catalyst at a temperature between about 100° C. and about 300° C. and a portion of the by-product ester substituted phenol is removed by distillation. The equilibration product may be a mixture comprising an ester substituted phenol solvent and a polycarbonate comprising terminal phenoxy groups having structure I and having a number average molecular weight in excess of 5000 daltons. This equilibration product is then fed to a devolatilizing extruder wherein the polycarbonate is converted to still higher molecular weight product polycarbonate, said product polycarbonate having a high level of endcapping, a low level of Fries product, and a low level of residual solvent. In one embodiment of the present invention, a portion of the ester substituted phenol formed during equilibration is distilled from the mixture undergoing equilibration and a like amount of ODCB is added to provide a solution comprising a polycarbonate having a number average molecular weight in excess of 5000 daltons, ester substituted phenol and ODCB. This solution is then fed to a devolatilizing extruder wherein the polycarbonate is converted to a product polycarbonate having a higher molecular weight, said product polycarbonate having a Fries content of under 10 ppm, an endcapping level of at least 97%, and less than 1 percent by weight solvent. Typically, in instances in which the polycarbonate formed in the equilibration reaction has a number average molecular weight in excess of 5000 daltons, it will have a $M_n$ value in a range between 5000 daltons and about 15000 daltons.

Oligomeric polycarbonates comprising ester substituted terminal phenoxy groups I may be prepared by a variety of other methods in addition to the equilibration method described. For example, oligomeric bischloroformates of bisphenols may be prepared by reaction of one or more bisphenols with phosgene under interfacial conditions in a methylene chloride water mixture at low pH. Such bischloroformates may then be further reacted under interfacial conditions with an ester substituted phenol, for example methyl salicylate, to afford an oligomeric polycarbonate comprising ester substituted terminal phenoxy groups in methylene chloride solution. The product oligomeric polycarbonate in solution may then be subjected to the method of the present invention. Catalysts employed during the interfacial reaction are typically removed from the solution of the oligomeric polycarbonate in a series of washing steps in which the methylene chloride solution of the oligomeric polycarbonate is washed repeatedly with water to remove sodium chloride. Under such circumstances, additional catalyst may be required and may be added during or just prior to the extrusion step.

In one embodiment, a monofunctional phenol chainstopper is added to a solution of an oligomeric polycarbonate comprising ester substituted phenoxy terminal groups, said oligomeric polycarbonate being prepared using the equilibration technique described herein. The solution is then subjected to extrusion devolatilization to afford a product polycarbonate incorporating terminal phenoxy groups derived from said chainstopper. Suitable monofunctional phenol chainstoppers include p-cumylphenol and cardanol.

Figure 2:
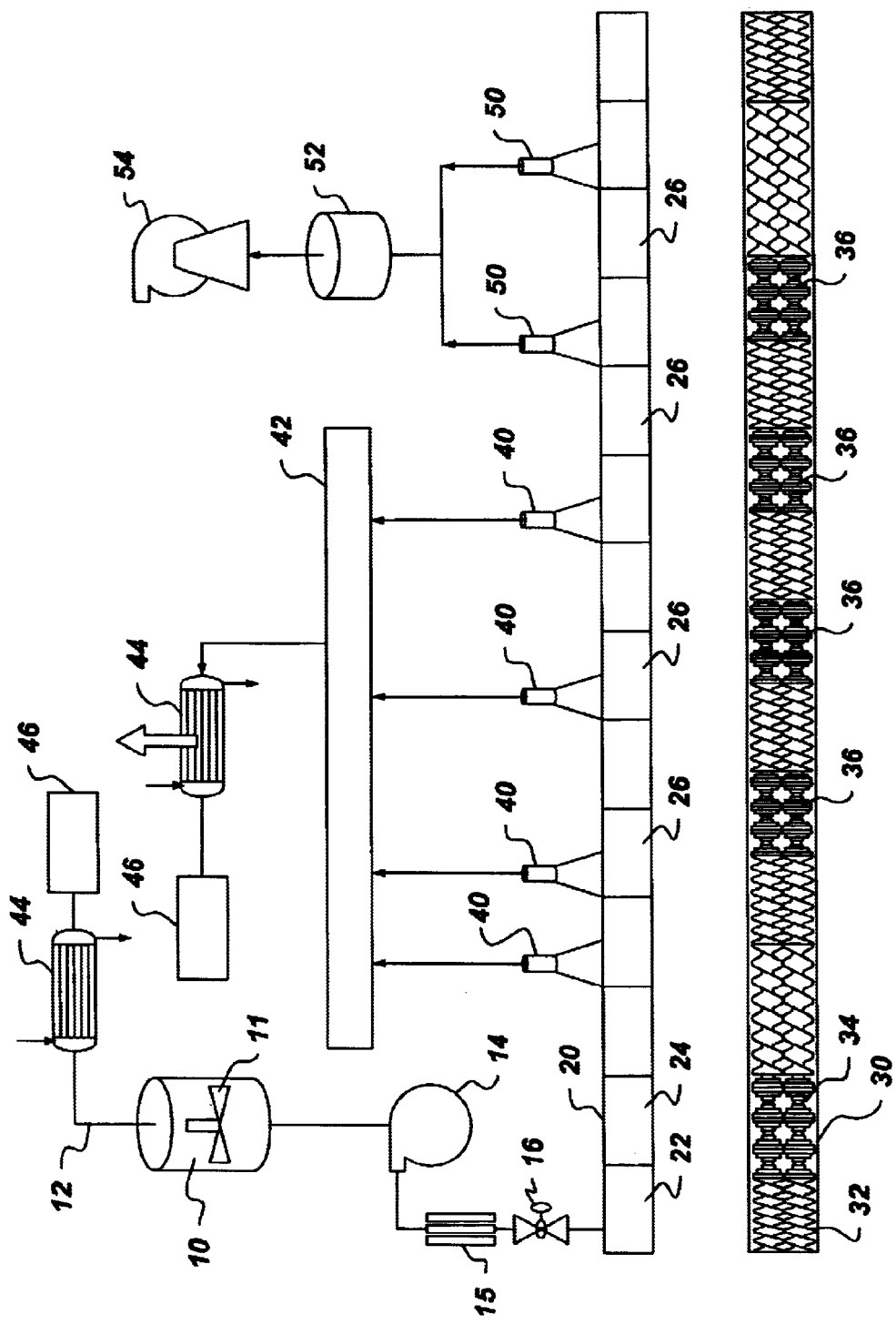
FIG. 2 illustrates an alternative configuration for a devolatilizing extruder and feed system suitable for use according to the method of the present invention.
Figure 3:
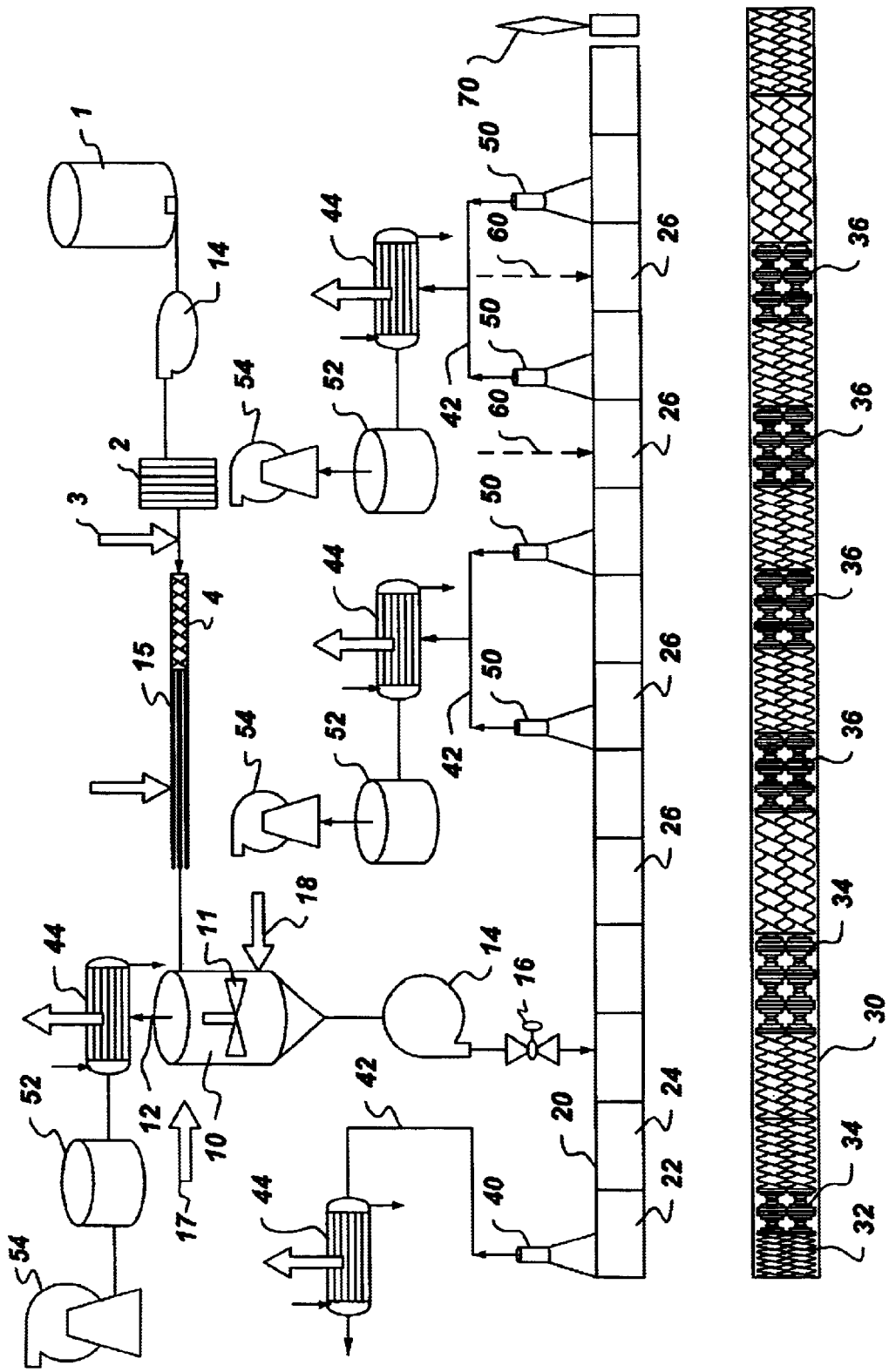
FIG. 3 illustrates yet another devolatilizing extruder and feed system suitable for use according to the method of the present invention.

The extruder used according to the method of the present invention is of the devolatilizing extruder type. That is, it is an extruder adapted for separating substantial amounts of solvent from a polymer-solvent mixture. The extruder, therefore must possess at least one and preferably a greater number of vents adapted for solvent removal. FIG. 1, FIG. 2 and FIG. 3 illustrate devolatilizing extruders and feed systems suitable for use according to the method of the present invention. In one embodiment of the invention (illustrated here with reference to FIG. 1) reactants, ester substituted diaryl carbonate, dihydroxy aromatic compound and a transesterification catalyst are combined in a reaction vessel 10 and heated at a temperature in a range between about 100° C. and about 300° C., preferably between about 150° C. and about 250° C., at a pressure between about 1 atmosphere and about 10 atmospheres, preferably between about 1 and about 2 atmospheres, to provide a solution of an oligomeric polycarbonate in an ester substituted phenol. The solution is transferred by means of a gear pump 14 via piping 17 which is directly plumbed into a fourteen barrel, vented, twin screw extruder 20, said extruder possessing screw design 30. The extruder is operated at a temperature between about 100° C. and about 400° C., preferably between about 200° C. and about 350° C., at a screw speed between about 50 and about 1200 rpm. The solution is introduced into the upstream edge of barrel one 22. The segmentations along the extruder indicate the transitions from one extruder barrel to the next. Barrel two is labeled 24. (The remaining barrels 3–14 are not labeled.) The extruder screw design 30 consists of conveying screw elements illustrated by 32 and mixing sections which include an initial mixing section 34 and four zones of intense mixing 36. The extruder is equipped with four atmospheric vents 40, said vents being connected to a manifold 42 for removal of ester substituted phenol solvent and other volatile by-products formed as the oligomeric polycarbonate is converted into product polycarbonate within the extruder. Solvent vapors and other volatile by-products are condensed in a shell and tube condenser 44 which is attached to a source of house vacuum 46. The extruder is further equipped with two vacuum vents 50. Vacuum vents 50 are connected via a cold trap 52 to a vacuum pump 54. As mentioned, the extruder comprises four mixing sections which provide for intense mixing of the contents of the extruder. These are indicated in the screw design 30 as the mixing sections labeled 36. Mixing sections labeled 36 in the screw design correspond to reaction zones 26 of the extruder. Said reaction zones are believed to provide for enhanced rates of polycarbonate chain growth relative to other domains within the extruder.

In an alternate embodiment of the invention (illustrated here with reference to FIG. 2) reactants, ester substituted diaryl carbonate, dihydroxy aromatic compound and a transesterification catalyst are combined in a reaction vessel 10 and heated at a temperature in a range between about 100° C. and about 300° C., preferably between about 150° C. and about 250° C., at a pressure between about 0.0001 and about 10 atmospheres, preferably between about 0.001 and about 2 atmospheres, to provide a solution of an oligomeric polycarbonate in an ester substituted phenol. The reaction vessel 10 is adapted for operation at either subambient, ambient or elevated pressure, and is equipped with a mixer 11. The reaction vessel 10 is connected via a solvent recovery manifold 12 to a condenser 44. The solution is transferred by means of a gear pump 14 through a heat exchanger 15 wherein the solution is superheated. Heat exchanger 15 is linked to pressure control valve 16 which is directly plumbed into a fourteen barrel, vented, twin screw extruder 20, said extruder possessing screw design 30. The extruder is operated at a temperature between about 100° C. and about 400° C., preferably between about 200° C. and about 350° C., at a screw speed between about 50 and about 1200 rpm. The solution is introduced into the upstream edge of barrel one 22. The segmentations along the extruder indicate the transitions from one extruder barrel to the next. Barrel two is labeled 24. (The remaining barrels 3–14 are not labeled.) The extruder screw design 30 consists of conveying screw elements illustrated by 32 and mixing sections which include an initial mixing section 34 and four zones of intense mixing 36. The extruder is equipped with four atmospheric vents 40, said vents being connected to a manifold 42 for removal of ester substituted phenol solvent and other volatile by-products formed as the oligomeric polycarbonate is converted into product polycarbonate within the extruder. Solvent vapors and other volatile by-products are condensed in a shell and tube condenser 44 which is attached to a source of house vacuum 46. The extruder is further equipped with two vacuum vents 50.

Vacuum vents 50 are connected via a cold trap 52 to a vacuum pump 54. As mentioned, the extruder comprises four mixing sections which provide for intense mixing of the contents of the extruder. These are indicated in the screw design 30 as the mixing sections labeled 36. Mixing sections labeled 36 in the screw design correspond to reaction zones 26 of the extruder. Said reaction zones are believed to provide for enhanced rates of polycarbonate chain growth relative to other domains within the extruder.

In yet another embodiment of the invention (illustrated here with reference to FIG. 3) monomers; ester substituted diaryl carbonate, and dihydroxy aromatic compound, are combined in a vessel 1 and heated at a temperature in a range between about 100° C. and about 300° C., preferably between about 150° C. and about 250° C., to provide a molten mixture of monomers which is transferred forward into the system the system by means of gear pump 14 through. Vessel 1 is optimally equipped with a means for stirring the molten mixture. Flow meter 2 provides for accurate metering of the molten mixture of monomers into the downstream sections of the system. A transesterification catalyst may be added to the molten mixture of monomers at point 3 or directly into vessel 1. The molten mixture of monomers optionally comprising a transesterification catalyst is introduced via static mixer 4 into heat exchanger 15 and from thence into reaction vessel 10. Reaction vessel 10 comprises at least one stirrer 11 and is adapted for removal of ester substituted phenol solvent formed as the monomers equilibrate to form a solution comprising an oligomeric polycarbonate, said oligomeric polycarbonate comprising ester-substituted phenoxy endgroups. Ester-substituted phenol solvent is removed via solvent removal manifold 12 which is attached to condenser 44, cold trap 52 and vacuum pump 54. Reaction vessel 10 is further adapted for introduction of additional monomers, catalyst or solvents at one or more of points 17 and 18. Typically the solution of oligomeric polycarbonate is heated to a temperature between about 150° C. and 300° C. The solution of oligomeric polycarbonate is then transferred via gear pump 14 via pressure control valve 16 which is directly plumbed into the feed inlet zone of a fourteen barrel, vented, twin screw, devolatilizing extruder 20, said extruder possessing screw design 30. The extruder is operated at a temperature between about 100° C. and about 400° C., preferably between about 200° C. and about 350° C., at a screw speed between about 50 and about 1200 rpm. The solution is introduced into the upstream edge of barrel 3 The segmentations along the extruder indicate the transitions from one extruder barrel to the next. Barrel two is labeled 24. (The remaining barrels 3–14 are not labeled.) The extruder screw design 30 consists of conveying screw elements illustrated by 32 and mixing sections which include an initial mixing section 34 and four zones of intense mixing 36. The extruder is equipped with an atmospheric vent 40 connected to manifold 42 for removal of ester substituted phenol solvent and other volatiles. Solvent vapors and other volatile by-products are condensed in a shell and tube condenser 44 which may be attached to a source of house vacuum or operated at atmospheric pressure. Atmospheric vent 40 is positioned so that at least one kneading block 34 is interposed between the feed inlet zone (the zone directly under pressure control valve 16) and the atmospheric vent. This interposition of the kneading block between the feed inlet zone and the atmospheric vent serves to prevent entrainment of solids out through the atmospheric vent by escaping solvent vapors. The extruder 20 is further equipped with four vacuum vents 50. Here again, a kneading block 34 is interposed between the feed inlet zone the vacuum vents in order to prevent the entrainment of solids by the rapidly escaping solvent vapors. Vacuum vents are located over conveying elements 32 to minimize the movement of polymer into the vents themselves. Vacuum vents 50 are connected via solvent manifolds 42, condensers 44, and cold traps 52, to vacuum pumps 54. As mentioned, the extruder comprises four mixing sections which provide for intense mixing of the contents of the extruder. These are indicated in the screw design 30 as the mixing sections labeled 36. Mixing sections labeled 36 in the screw design correspond to reaction zones 26 of the extruder. The reaction zones 26 are believed to provide for enhanced rates of polycarbonate chain growth relative to other domains within the extruder. Additionally, the system illustrated in FIG. 3 comprises optional water injection inlets 60 which provide for enhanced removal of volatile components from the polycarbonate being prepared. Finally, the extruder is equipped with one or more sensors 70 which may be used to monitor melt temperature, die pressure, torque or other system parameters which in turn may be used as when operating the system according to a closed loop control strategy. For example, because melt temperature, die pressure and torque are strongly dependent upon the molecular weight of the product polycarbonate, sensors monitoring melt temperature and torque might indicate that additional monomer or catalyst should be added upstream (e.g. at inlet 17) in order to reduce or increase the molecular weight of the product polycarbonate emerging from the extruder die face.

The extruder used according to the method of the present invention, which may be a single screw or multiple screw extruder is typically operated at one or more temperatures in a range between about 100° C. and about 400° C. and at one or more screw speeds in a screw speed range, said range being between about 50 revolutions per minute (rpm) and about 1200 rpm, preferably between about 50 rpm and about 500 rpm.

Extruders suitable for use according to the method of the present invention include co-rotating intermeshing double screw extruders, counter-rotating non-intermeshing double screw extruders, single screw reciprocating extruders, and single screw non-reciprocating extruders.

It is a general principle of extruder operation that as the feed rate is increased a corresponding increase in the screw speed must be made in order to accommodate the additional material being fed. Moreover, the screw speed determines the residence time of the material being fed to the extruder, here the solution of the oligomeric polycarbonate and transesterification catalyst. Thus the screw speed and feed rate are typically interdependent. It is useful to characterize this relationship between feed rate and screw speed as a ratio. Typically the extruder is operated such that the ratio of starting material introduced into the extruder in pounds per hour to the screw speed expressed in rpm falls within a range of from about 0.01 to about 100, preferably from about 0.05 to about 5. For example, the ratio of feed rate to screw speed where the solution of comprising an oligomeric polycarbonate and transesterification catalyst are being introduced at 1000 pounds per hour into an extruder be in operated at 400 rpm is 2.5. The maximum and minimum feed rates and extruder screw speeds are determined by, among other factors, the size of the extruder, the general rule being the larger the extruder the higher the maximum and minimum feed rates.

As noted, in one embodiment of the present invention, a mixture of an oligomeric polycarbonate comprising endgroups having structure I and a solvent is heated under pressure to produce a "superheated" solution, meaning that the temperature of said superheated solution is greater than the boiling point of the solvent at atmospheric pressure. Typically, the temperature of the superheated oligomeric polycarbonate will be between about 2° C. and about 200° C. higher than the boiling point of the solvent at atmospheric pressure. In instances where there are multiple solvents present, the solution of oligomeric polycarbonate is "superheated" with respect to at least one of the solvent components. Where the solution of oligomeric polycarbonate contains significant amounts of both high and low boiling solvents, it may be advantageous to superheat the solution of oligomeric polycarbonate with respect to all solvents present (i.e. above the boiling point at atmospheric pressure of the highest boiling solvent). Superheating of the solution of the oligomeric polycarbonate may be achieved by heating the mixture under pressure, typically at a pressure less than about 10 atmospheres but greater than one atmosphere. Superheated solutions of oligomeric polycarbonates are conveniently prepared in pressurized heated feed tanks, pressurized heat exchangers, extruders, pressurized reaction vessels and the like. The superheated solution is then introduced into a devolatilizing extruder through a pressure control valve, the pressure control valve having a cracking pressure higher than atmospheric pressure. The backpressure generated by the pressure control valve prevents evaporation of the solvent prior to introducing the solution into the extruder. Typically, the pressure control valve is attached (plumbed) directly to the extruder and serves as the principal feed inlet of the extruder. In one embodiment of the present invention in which the oligomeric polycarbonate comprising ester-substituted phenoxy endgroups is introduced into a devolatilizing extruder as a superheated solution, the extruder is equipped with at least one side feeder.

In one embodiment, the extruder in combination with the side feeder is equipped with one or more atmospheric vents in close proximity to the principal feed inlet comprising the pressure control valve. The side feeder is typically positioned in close proximity to the pressure control valve through which the superheated oligomeric polycarbonate is introduced into the extruder. The side feeder comprises at least one atmospheric vent. Alternatively, the pressure control valve through which the superheated oligomeric polycarbonate is introduced may be-attached to the side feeder itself in which instance the pressure control valve is attached to the side feeder at a position between the point of attachment of the side feeder to the extruder and the atmospheric vent located on the side feeder. In yet another alternative embodiment, the superheated solution of oligomeric polycarbonate may be introduced through multiple pressure control valves which may be attached to the side feeder, the extruder, or to both extruder and side feeder. The heated zones of the extruder are typically operated at one or more temperatures between about 100° C. and about 400° C. The expression "wherein the extruder is operated at a temperature between about 100° C. and about 400° C." refers to the heated zones of the extruder, it being understood that the extruder may comprise both heated and unheated zones.

The superheated solution of oligomeric polycarbonate passes through the pressure control valve into the feed zone of the extruder which due to the presence of the aforementioned atmospheric vents is at atmospheric pressure. The solvent present in the superheated solution of oligomeric polycarbonate undergoes sudden and rapid evaporation thereby effecting at least partial separation of the oligomeric polycarbonate and the solvent. The solvent vapors emerge through the atmospheric vents. The atmospheric vents are attached to a solvent vapor manifold and condenser in order to recover solvent and prevent its adventitious release. Additionally, the extruder is equipped with at least one vent operated at subatmospheric pressure which serves to remove solvent not removed through the atmospheric vents. Vents operated at subatmospheric pressure are referred to herein as "vacuum vents" and are maintained at from about 1 to about 30, preferably from about 10 to about 29 inches of mercury as measured by a vacuum gauge measuring vacuum (as opposed to a pressure gauge measuring pressure). Typically, at least two vacuum vents are preferred.

Extruders suitable for use in embodiments of the present invention wherein a superheated oligomeric polycarbonate solution is being fed include co-rotating intermeshing double screw extruders, counter-rotating non-intermeshing double screw extruders, single screw reciprocating extruders, and single screw non-reciprocating extruders.

In some instances, it may be found that the product polycarbonate prepared according to the method of the present invention is of insufficient molecular weight or retains too much of the solvent originally present in the solution of the oligomeric polycarbonate. In such instances, simply subjecting the product polycarbonate to a second extrusion on the same or a different devolatilizing extruder typically results in a product polycarbonate having an increased molecular weight and a reduced level of residual solvent. Thus, in one embodiment of the present invention, a solution of an oligomeric polycarbonate comprising terminal groups having structure I and a solvent is subjected to devolatilization extrusion at a temperature between about 100° C. and about 400° C. on an extruder equipped with at least one vent adapted for solvent removal to provide an initial product polycarbonate. The initial product polycarbonate is then introduced into a second extruder, said second extruder being equipped with at least one vacuum vent. The second extruder is operated at a temperature in a range between about 100° C. and about 400° C., and at a screw speed in a range between about 50 and about 1200 rpm.

The method of the present invention may be carried out in a batch or continuous mode. In one embodiment, the method of the present invention is carried out as a batch process wherein monomers and transesterification catalyst are equilibrated in a batch reactor to form a solution of the oligomeric polycarbonate. This solution is then fed to a devolatilizing extruder and the product polycarbonate is isolated until the solution is consumed. Alternatively, the method of the present invention may be carried out as a continuous process wherein the monomers and catalyst are continuously fed to, and the solution of oligomeric polycarbonate is continuously removed from a continuous reactor. Thus a mixture of BMSC, BPA and transesterification catalyst may be fed to one end of a tube reactor heated to a temperature between about 160° C. and about 250° C. A solution of an oligomeric polycarbonate comprising phenoxy endgroups II emerges at the opposite end of the tube reactor and is fed to a devolatilizing extruder from which emerges the product polycarbonate.

It is understood, especially for melt reactions of the type presented in the instant invention, that purity of the monomers employed may strongly affect the properties of the product polycarbonate. Thus, it is frequently desirable that the monomers employed be free of, or contain only very limited amounts of, contaminants such as metal ions, halide ions, acidic contaminants and other organic species. This may be especially true in applications such as optical disks, (e.g. compact disks) where contaminants present in the polycarbonate can affect disk performance. Typically the concentration of metal ions, for example iron, nickel, cobalt, sodium, and postassium, present in the monomer should be less than about 10 ppm, preferably less than about 1 ppm and still more preferably less than about 100 parts per billion (ppb). The amount of halide ion present in the polycarbonate, for example fluoride, chloride and bromide ions, should be minimized in order to inhibit the absorption of water by the product polycarbonate as well as to avoid the corrosive effects of halide ion on equipment used in the preparation of the polycarbonate. Certain applications, for example optical disks, may require very low levels of halide ion contaminants. Preferably, the level of halide ion present in each monomer employed should be less than about 1 ppm. The presence of acidic impurities, for example organic sulfonic acids which may be present in bisphenols such as BPA, should be minimized since only minute amounts of basic catalysts are employed in the oligomerization and subsequent polymerization steps. Even a small amount of an acidic impurity may have a large effect on the rate of oligomerization and polymerization since it may neutralize a substantial portion of the basic catalyst employed. Lastly, the tendency of polycarbonates to degrade at high temperature, for example during molding, with concomitant loss of molecular weight and discoloration correlates strongly with the presence of contaminating species within the polycarbonate. In general, the level of purity of a product polycarbonate prepared using a melt reaction method such as the instant invention will closely mirror the level of purity of the starting monomers.

Product polycarbonates prepared by the method of the present invention frequently contain only very low levels of Fries products. In many cases no Fries product is detectable when the polycarbonate is subjected to a Fries product analysis. The Fries product analysis is carried out by completely hydrolyzing the polycarbonate and analyzing the hydrolysis product by HPLC. For bisphenol A polycarbonate produced by the method of the present invention, the level of Fries product is a value expressed as parts 2-carboxy bisphenol A per million parts of the product bisphenol A polycarbonate which was subjected to hydrolysis. For bisphenol A polycarbonates prepared using the method of the present invention this value is frequently zero or very close to it.

The product polycarbonates prepared according to the method of the present invention are found to have very high levels, frequently 97 percent or higher, of endcapping. Typically product polycarbonates will be from about 97 to about 99 percent endcapped. Free hydroxyl groups at the polycarbonate chain ends are typically comprise less than about 100 ppm of the total polymer weight. Two types of free hydroxyl chain ends are typically observed for polycarbonates prepared according to the method of the present invention from BPA and BMSC: hydroxyl groups attached to a BPA residue ("BPA OH"), and hydroxyl groups attached to a salicyl ester residue ("salicyl OH"). Typically, the concentration of "BPA OH" endgroups is less than about 100 ppm based on the total weight of the product polymer. Likewise, the concentration of "salicyl OH" is typically less than about 100 ppm. Endgroups bearing "salicyl OH" groups have the structure indicated by structure XI

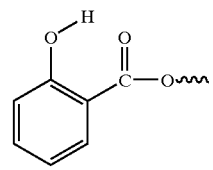

XI and are quantified by nuclear magnetic resonance spectroscopy (NMR). It should be noted that the concentrations of hydroxyl endgroups and percent endcapping described above refers to product polycarbonate and not the oligomeric polycarbonate. Additionally, in instances in which the product polycarbonate has been prepared by first equilibrating a mixture of an ester substituted diaryl carbonate with one or more dihydroxy aromatic compounds to afford a solution comprising an oligomeric polycarbonate and subsequently subjecting said solution to extrusion on a devolatilizing extruder, the concentrations of hydroxyl endgroups and percent endcapping in the product polycarbonate will reflect the molar ratio of ester substituted diaryl carbonate to total dihydroxy aromatic compound. Typically, this ratio should be in a range between about 1.01 and about 1.1. Typically, the product polycarbonate prepared by the method of the present invention will contain only very small amounts of residual starting dihydroxy aromatic compound (generally less than about 20 ppm) and ester substituted diaryl carbonate (generally less than about 350 ppm).

The product polycarbonates prepared by the method of the present invention may optionally be blended with any conventional additives used in thermoplastics applications, such as preparing molded articles. These additives include UV stabilizers, antioxidants, heat stabilizers, mold release agents, coloring agents, antistatic agents, slip agents, antiblocking agents, lubricants, anticlouding agents, coloring agents, natural oils, synthetic oils, waxes, organic fillers, inorganic fillers, and mixtures thereof. Typically, it is preferable to form a blend of the polycarbonate and additives which aid in processing the blend to form the desired molded article, such as an optical article. The blend may optionally comprise from 0.0001 to 10% by weight of the desired additives, more preferably from 0.0001 to 1.0% by weight of the desired additives.

Examples of UV absorbers include, but are not limited to, salicylic acid UV absorbers, benzophenone UV absorbers, benzotriazole UV absorbers, cyanoacrylate UV absorbers and mixtures thereof.

Examples of the aforementioned heat-resistant stabilizers, include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polylydric alcohol esters of fatty acids, polyglycol esters of fatty acids, and other fatty acid ester mold release agents; silicone oil and other silicone mold release agents, and mixtures of any of the aforementioned.

The coloring agent may be either pigments or dyes. Inorganic coloring agents and organic coloring agents maybe used separately or in combination in the invention.

The polycarbonates prepared by the method of the present invention may be random copolymers, block copolymers, branched or linear When the product polycarbonate is branched a suitable branching agent, such as THPE, 9-carboxyoctadecandioic acid, or 1,3,5-trihydroxybenzene is employed. For example, the inclusion of about 0.02 moles of THPE per mole of BPA in the equilibration reaction of 1 mole of BPA with 1.03 moles of BMSC to form an a solution comprising an oligomeric polycarbonate in methyl salicylate, and subsequent extrusion of the solution on a devolatilizing extruder according to the method of the present invention will provide a branched bisphenol A polycarbonate.

Molded articles, such as a molded optical article, comprising the polycarbonates prepared by the method of the present invention, may be obtained by conventional molding techniques, for example injection molding and compression molding. Additionally molded articles may be prepared from a blend of the product polycarbonate with one or more additional polymers. Such blends, typically prepared using extrusion methods, may be molded using conventional techniques. Injection molding is the more preferred method of forming the molded article.

Because the polycarbonates prepared by the method of the present invention possess advantageous properties such as high impact strength, high clarity, low water absorption, good processability and low birefringence, they can be advantageously utilized to produce optical articles. End-use applications for the optical article of the invention include, but are not limited to, a digital audio disk, a digital versatile disk, an optical memory disk, a compact disk, an ASMO device and the like; optical lenses, such as contact lenses, lenses for glasses, lenses for telescopes, and prisms; optical fibers; magneto optical disks; information recording media; information transferring media; disks for video cameras, disks for still cameras and the like.

The polycarbonates prepared by the method of the present invention may function as the medium for data storage, i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in °C.

Molecular weights are reported as number average ($M_n$) or weight average ($M_w$) molecular weight and were determined by gel permeation chromatography (GPC) analysis, using a polycarbonate molecular weight standard to construct a broad standard calibration curve against which polymer molecular weights were determined. The temperature of the gel permeation columns was about 25° C. and the mobile phase was chloroform.

Fries content was measured by the KOH methanolysis of resin and is reported as parts per million (ppm). The Fries content was determined as follows. First, 0.50 grams of polycarbonate was dissolved in 4.0 ml of THF (containing p-terphenyl as internal standard). Next, 3.0 mL of 18% KOH in methanol was added to this solution. The resulting mixture was stirred for two hours at room temperature. Next, 1.0 mL of acetic acid was added, and the mixture was stirred for 5 minutes. Potassium acetate by-product was allowed to crystallize over 1 hour. The solid was filtered off and the resulting filtrate was analyzed by high performance liquid chromatography (HPLC) using p-terphenyl as the internal standard.

Concentrations of "BPA-OH" and "salicyl-OH" end-groups were measured by $^{31}$P-NMR. Terminal hydroxy groups were first derivatized with 2-chloro-1,3,2-dioxaphospholane (Aldrich). The concentration of residual methyl salicylate was measured by $^{31}$P-NMR or by gel permeation chromatography.

Examples 1–5

Solutions of oligomeric polycarbonate in methyl salicylate were prepared by equilibrating a mixture of bis(methyl salicyl)carbonate (BMSC), bisphenol A (BPA) and transesterification catalyst, tetrabutylphosphonium acetate (TBPA), at a temperature in a range between about 160° C. and about 220° C. in a batch melt reactor under a nitrogen atmosphere. The reaction mixture was stirred and heated until equilibrium was reached. Equilibrium was reached in about 80 minutes at about 165° C. and in about 10 minutes at about 220° C. At equilibrium, the solution of oligomeric polycarbonate prepared from mixtures of BMSC (1.03 moles BMSC per mole BPA), BPA and TBPA ($2.5 \times 10^{-4}$ moles per mole BPA) was about 45 percent by weight polycarbonate oligomer and about 54 to about 55 percent by weight methyl salicylate.

TABLE 1

SOLUTIONS OF OLIGOMERIC POLYCARBONATE IN METHYL SALYCILATE

| Example | [BMSC]/ [BPA] | Mole TBPA Catalyst per Mole BPA | Equilibration Temperature | Time to Equilibrium | Oligomeric Polycarbonate Mn |
|---|---|---|---|---|---|
| 1 | 1.03 | $2.5 \times 10^{-4}$ | 220° C. | 10 minutes | 1385 |
| 2 | 1.03 | $2.5 \times 10^{-4}$ | 210° C. | 18 minutes | 1474 |
| 3 | 1.03 | $2.5 \times 10^{-4}$ | 195° C. | 30 minutes | 1670 |
| 4 | 1.03 | $2.5 \times 10^{-4}$ | 180° C. | 52 minutes | 1849 |
| 5 | 1.03 | $2.5 \times 10^{-4}$ | 160° C. | 90 minutes | 2090 |

Examples 1–5 in Table 1 illustrate both the characteristics of the equilibrated solution at different temperatures and document the truly oligomeric nature of the material being fed to the extruder. The column heading "[BMSC]/[BPA]" indicates the molar ratio of BMSC and BPA employed in the equilibration reaction. The heading "Mn" indicates the number average molecular weight as determined by gel permeation chromatography measured using a polycarbonate molecular weight standard. Values of $M_n$ are given in daltons. The data in Table 1 illustrate the speed at which equilibration of the reactants can be achieved. Example 1 indicates that solid reactants can be converted into a solution of an oligomeric polycarbonate and transesterification catalyst in methyl salicylate solvent in as little as ten minutes. Because residence times in the extruder are short (from about 0.5 to about 2 minutes on the equipment being used in the Examples which follow), the overall process of converting starting monomers into product polycarbonate can be achieved in under 15 minutes.

Examples 6–101

Solutions of oligomeric bisphenol A polycarbonate in methyl salicylate were prepared as in Examples 1–5 at an equilibration temperature of about 160° C. using as a catalyst either TBPA alone (as in Examples 1–5) or a combination of TBPA with sodium hydroxide. The amount of catalyst employed was $2.5 \times 10^{-4}$ moles TBPA per mole BPA and (when present) $2 \times 10^6$ moles sodium hydroxide per mole BPA. Following the equilibration reaction, the solution was transferred by means of nitrogen pressure (about 80 psi) to a gear pump which pumped the solution via an insulated pipe connected directly (hard plumbed) to the upstream edge of barrel one of a 25 millimeter diameter, 14 barrel, co-rotating intermeshing twin screw extruder having a length to diameter ratio of 56. The extruder comprised 6 vents V1–V6 located at the upstream edges of barrel four (V1, vacuum or atmospheric vent), barrel five (V2, optionally closed but at times operated as atmospheric or vacuum vent), barrel seven (V3, vacuum vent), barrel nine (V4, vacuum vent), barrel eleven (V5, vacuum vent) and barrel thirteen (V6, vacuum vent). Vent V1 was operated at atmospheric pressure or alternatively under a slight vacuum (5–10 in. Hg, as measured by a vacuum gauge). Vacuum vents V3 and V4 were operated at moderate vacuum (10–28 in. Hg). Vacuum vents V5 and V6 were operated at moderate to high (>29 in Hg) vacuum. When operated at slight to moderate vacuum (5–28 in Hg), vacuum was supplied to vents V2–V6 with "house" vacuum. In a number of instances, vacuum vent V6 or vacuum vents V5 together with V6 were operated under high (i.e. "full") vacuum (~29 in. Hg. as measured by a vacuum gauge). The vacuum vents were connected through solvent recovery manifold and condenser systems to their respective sources of vacuum. In instances in which either V6 alone or V5 and V6 were operated at "full" vacuum, the vent or vents being operated at "full" vacuum were connected via a cold trap to a vacuum pump. Vents V1 and V3–V6 were equipped with type "C" vent port inserts. Vent port inserts are available from the Werner & Pfleiderer Company. Vent port inserts differ in the cross sectional area available for the solvent vapors to escape the extruder: Type "A" inserts are the most restrictive (smallest cross section) and Type "C" are the east restrictive (largest cross section). As noted, V2 was kept closed in some instances and remained open in others. The screw design comprised conveying elements under the feed inlet and all vents. The screw design further comprised kneading blocks in four "reaction zones" (zones comprising screw elements providing intense mixing) located between vents. The four reaction zones were located between V2 and V3, between V3 and V4, between V4 and V5, and between V5 and V6 respectively. The data in Tables 2–5 below demonstrate the effects of changes in reaction conditions on the properties of the product polycarbonate.

TABLE 2

EXTRUSION OF SOLUTION OF OLIGOMERIC POLYCARBONATE IN METHYL SALICYLATE, BMSC/BPA = 1.017, Catalyst = TBPA + NaOH

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 6 | atm | 10 | 22 | 22 | 22 | 40/17.6 | 29 | 288 | 104 | 163 |
| 7 | Atm. | 18 | 26 | 25 | 25 | 40/17.6 | 35 | 290 | 104 | 242 |
| 8 | Atm. | 15 | 26 | 25 | 25 | 46/20.2 | 42 | 293 | 144 | 329 |
| 9 | Atm. | 15 | 26 | 25 | 25 | 50/22.0 | 50 | 302 | 200 | 347 |
| 10 | Atm. | 15 | 26 | 25 | 25 | 55/24.2 | 51 | 308 | 248 | 342 |
| 11 | Atm. | 15 | 26 | 25 | 25 | 55/24.2 | 50 | 306 | 248 | 316 |

| Example | Actual Barrel Temperatures (° C.) | Molecular Weight Mw/Mn/PDI | Residual MS (ppm) |
|---|---|---|---|
| 6 | 256/277/277/280/280/280/281/281/280 | 22779/10042/2.268 | 9792 |
| 7 | 254/278/277/280/280/280/281/280/280 | 25295/11167/2.265 | 6115 |
| 8 | 245/279/278/280/280/280/281/280/280 | 26930/11938/2.256 | 4419 |
| 9 | 241/279/279/280/280/280/284/281/280 | 27063/11921/2.270 | 4544 |
| 10 | 238/279/278/280/280/280/283/281/280 | 26683/11629/2.295 | 4989 |
| 11 | 236/280/279/280/280/280/280/280/280 | 26474/11622/2.278 | 4296 |

In Examples 6–11 (Table 2) the ratio of BMSC to BPA employed in the equilibration reaction was 1.017. The catalyst employed for the equilibration reaction was a mixture of tetrabutylphosphonium acetate and sodium hydroxide. The oligomeric polycarbonate in methyl salicylate (MS) solution was found to have a weight average molecular weight, Mw, of 6865 daltons and a number average molecular weight, Mn, of 2980 daltons. In Examples 6–11 the polycarbonate emerging from the extruder was observed to be clear and free of color. Following pelletization the level of residual methyl salicylate present in the product polycarbonate was determined by gas chromatography. The data provided in Examples 6–11 illustrate that polycarbonate may be prepared using the method of the present invention and that the product so obtained contains less than about 1 percent by weight methyl salicylate (MS).

TABLE 3

EXTRUSION OF SOLUTION OF OLIGOMERIC POLYCARBONATE IN
METHYL SALICYLATE, BMSC/BPA = 1.02, Catalyst = TBPA + NaOH

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 12 | Atm. | 26 | 27 | 25 | 29 | 40/17.6 | 62 | 307 | 154 | 520 |
| 13 | 5 | 27 | 27 | 25 | 29 | 40/17.6 | 74 | 312 | 182 | 558 |
| 14 | 15 | 28 | 28 | 28 | 29 | 40/17.6 | 74 | 313 | 182 | 576 |
| 15 | 12 | 28 | 28 | 28 | 29 | 40/17.6 | 54 | 299 | 118 | 562 |

| Example | Actual Barrel Temperatures (° C.) | Molecular Weight Mw/Mn/PDI | ppm OH total | % Endcap | Residual MS (ppm) |
|---|---|---|---|---|---|
| 12 | 249/303/282/280/281/280/280/282/281 | 31545/14191/2.223 | 115 | 95.2 | 1046.8 |
| 13 | 249/316/282/281/281/280/282/280/280 | 33106/14788/2.239 | 103 | 95.5 | 752.1 |
| 14 | 249/283/276/280/280/280/281/280/280 | 35070/15568/2.253 | 98 | 95.5 | 643.9 |
| 15 | 250/273/273/279/279/280/276/279/280 | 31437/14026/2.241 | 186 | 92.3 | 1403.2 |

In Examples 12–15 the solution of the oligomeric polycarbonate in methyl salicylate was prepared from a mixture of BMSC and BPA. The molar ratio of BMSC to BPA was 1.02. The catalyst employed in the equilibration step was a mixture of TBPA and sodium hydroxide. The data in Table 3 illustrate that use of higher levels of vacuum provides higher molecular weight polycarbonate containing still lower levels of residual methyl salicylate than is observed in Examples 6–11.

of BMSC and BPA. The molar ratio of BMSC to BPA was 1.025. The catalyst employed in the equilibration step was a mixture of TBPA and sodium hydroxide. During the extrusion step vents V5 and V6 were connected to a vacuum pump via a cold trap. Vents V1–V4 were connected to the "house vacuum" via a solvent recovery manifold and condenser. Vent V2 was employed and was connected to the same solvent recovery system and house vacuum as were

TABLE 4

EXTRUSION OF SOLUTION OF OLIGOMERIC POLYCARBONATE IN
METHYL SALICYLATE. BMSC/BPA = 1.025, Catalyst = TBPA + NaOH

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 16 | 12 | 28 | 28 | 29 | 29 | 40/17.6 | 55 | 295 | 106 | 486 |
| 17 | 10 | 28 | 28 | 29 | 29 | 40/17.6 | 62 | 293 | 106 | 508 |
| 18 | 10 | 28 | 28 | 29 | 29 | 46/20.2 | 60 | 302 | 133 | 592 |
| 19 | 5 | 28 | 28 | 29 | 29 | 46/20.2 | 60 | 302 | 150 | 599 |

| Example | Actual Barrel Temperatures (° C.) | Molecular Weight Mw/Mn/PDI | Residual MS (ppm) |
|---|---|---|---|
| 16 | 252/278/278/280/280/280/282/281/270 | 30670/13858/2.213 | 922.8 |
| 17 | 251/291/292/281/281/280/280/280/265 | 31436/14215/2.211 | 770.2 |
| 18 | 248/289/290/280/280/280/281/280/265 | 32470/14647/2.217 | 654.3 |
| 19 | 248/290/290/280/280/280/280/280/265 | 31944/14369/2.223 | 704.4 |

In Examples 16–19 the solution of the oligomeric polycarbonate in methyl salicylate was prepared from a mixture vents V1, V3 and V4. The vacuum level at which V2 was operated was not determined, however.

TABLE 5

EXTRUSION OF SOLUTION OF OLIGOMERIC POLYCARBONATE IN
METHYL SALICYLATE, BMSC/BPA = 1.03, Catalyst = TBPA + NaOH

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 20 | 13 | 28 | 28 | 29 | 29 | 40/17.6 | 37 | 284 | 114 | 250 |
| 21 | 13 | 28 | 28 | 29 | 29 | 40/17.6 | 37 | 285 | 114 | 235 |

TABLE 5-continued

EXTRUSION OF SOLUTION OF OLIGOMERIC POLYCARBONATE IN
METHYL SALICYLATE, BMSC/BPA = 1.03, Catalyst = TBPA + NaOH

| 22 | 12 | 28 | 28 | 29 | 29 | 40/17.6 | 50 | 301 | 230 | 181 |
| 23 | 10 | 28 | 28 | 29 | 29 | 40/17.6 | 56 | 313 | 351 | 152 |
| 24 | 10 | 28 | 28 | 29 | 29 | 40/17.6 | 58 | 325 | 464 | 123 |

| Example | Actual Barrel Temperatures (° C.) | Molecular Wt. Mw/Mn/PDI | ppm OH total | % Endcap | Residual MS (ppm) |
|---|---|---|---|---|---|
| 20 | 246/281/280/280/280/280/281/279/270 | 24456/11218/2.180 | 45 | 98.5 | 720.8 |
| 21 | 252/281/280/280/280/279/280/270 | 24237/11095/2.184 | 68 | 97.8 | 1003.9 |
| 22 | 253/280/280/280/281/280/284/281/271 | 25247/11527/2.190 | 48 | 98.4 | 559.4 |
| 23 | 252/280/280/280/281/280/285/280/270 | 26102/11891/2.195 | 23 | 99.2 | 307.1 |
| 24 | 251/281/281/281/281/280/283/281/270 | 26863/12030/2.233 | 18 | 99.4 | 183.4 |

Examples 20–24 illustrate the application of the method of the present invention to a solution of an oligomeric polycarbonate prepared from a mixture of BMSC and BPA having an initial molar ratio of 1.03 moles BMSC to BPA. The catalyst employed in the equilibration reaction was a mixture of tetrabutylphosphonium acetate and sodium hydroxide. Vacuum vent V2 was employed as in Examples 16–19 but the precise pressure at which it was operated was not determined. As in previous Examples, the product polycarbonates of Examples 20–24 were clear and free of color when inspected visually. The column heading "ppm OH total" refers to the concentration of "BPA-OH" and "salicyl-OH" present in the product polycarbonate as determined by $^{31}$P-NMR following derivatization with 2-chloro-1,3,2-dioxaphospholane. The column heading "% Endcap" refers to the percentage of the product polycarbonate chain ends which do not terminate in either "BPA-OH" or "salicyl-OH" groups. The data in Table 5 provide evidence that a very high level of endcapping is achieved using the method of the present invention and that the concentration of terminal OH groups in the product polycarbonate is very low.

Examples 25–30 illustrate the application of the method of the invention to a solution of an oligomeric polycarbonate prepared using only tetrabutyl phosphonium acetate and no sodium hydroxide. Here again, reasonably high molecular weight polycarbonate is obtained upon extrusion of the solution. Vacuum vent V2 was employed as in Examples 16–19 but the precise pressure at which it was operated was not determined. As in previous Examples the product polycarbonates of Examples 25–30 were clear and free of color when inspected visually. The data in Table 6 also reveal a high correlation between product polycarbonate molecular weight, feed rate and extruder screw speed. Thus, for data taken from Examples 25–30, if the product polycarbonate weight average molecular weight, $M_w$, is plotted against the feed rate in pounds per hour divided by the extruder screw speed in revolutions per minute an excellent linear correlation is observed. Similarly, if the residual methyl salicylate concentration in parts per million is plotted against the feed rate divided by the screw speed, an excellent linear correlation is observed.

TABLE 6

EXTRUSION OF SOLUTION OF OLIGOMERIC POLYCARBONATE IN
METHYL SALICYLATE, BMSC/BPA = 1.03, Catalyst = TBPA ONLY

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
| | V1 | V3 | V4 | V5 | V6 | | | | | |
|---|---|---|---|---|---|---|---|---|---|---|
| 25 | 14 | 28 | 28 | 29 | 29 | 40/17.6 | 35 | 282 | 113 | 286 |
| 26 | 14 | 28 | 28 | 29 | 29 | 40/17.6 | 35 | 283 | 113 | 280 |
| 27 | 12 | 28 | 28 | 29 | 29 | 40/17.6 | 46 | 298 | 229 | 238 |
| 28 | 14 | 28 | 28 | 29 | 29 | 40/17.6 | 54 | 313 | 355 | 183 |
| 29 | 14 | 28 | 28 | 29 | 29 | 40/17.6 | 56 | 325 | 464 | 149 |
| 30 | 14 | 28 | 28 | 29 | 29 | 70/30.7 | 48 | 323 | 464 | 209 |

| Example | Actual Barrel Temperatures (° C.) | Molecular Weight Mw/Mn/PDI | Residual MS (ppm) |
|---|---|---|---|
| 25 | 257/280/280/280/280/280/278/280/265 | 24549/11261/2.180 | 1134.4 |
| 26 | 258/280/280/280/280/280/279/280/265 | 24795/11367/2.181 | 959.5 |
| 27 | 257/280/280/280/280/280/283/280/265 | 25767/11797/2.184 | 402.2 |
| 28 | 256/280/280/280/281/280/284/281/265 | 26544/11656/2.277 | 216.8 |
| 29 | 255/280/281/281/281/280/283/281/265 | 26967/12255/2.200 | 148.9 |
| 30 | 251/276/277/278/278/280/280/280/265 | 26070/11877/2.195 | 435.9 |

Examples 31–37

Preparation of Copolymers

In Examples 31–37 copolymers were obtained by first equilibrating a mixture of bis(methyl salicyl)carbonate (BMSC), bisphenol A (BPA), and hydroquinone (HQ). The ratio of bis(methyl salicyl)carbonate to the total number of moles of the dihydroxy aromatic compounds bisphenol A and hydroquinone was 1.017. The equilibration was carried out as in Examples 1–5 and the resultant solution in methyl salicylate was extruded on an extruder configured as in Examples 6–11. The catalyst was a mixture of TBPA and sodium hydroxide. The temperature of the solution of the oligomeric copolycarbonate fed to the extruder was about 160° C. and was introduced into the extruder using a positive displacement pump. Examples 31–35 employed 20 mole percent hydroquinone (based on the total number of moles of BPA and HQ) in the equilibration step. Examples 36 and 37 employed 40 mole percent hydroquinone (based on the total number of moles of BPA and HQ) in the equilibration step. Data for the preparation of the copolycarbonates are provided in Table 7.

Examples 38–50 were run in order to demonstrate the consistency of the method of the present invention. A solution of an oligomeric polycarbonate was prepared as in Example 5. The molar ratio of BMSC to BPA was 1.03. The transesterification catalyst was tetrabutylphosphonium acetate (TBPA, $2.5 \times 10^{-4}$ moles TBPA per mole BPA). The extruder was configured as in Examples 16–19. The data presented in Table 8 illustrate consistent molecular weight build in the conversion of the oligomeric polycarbonate into the product polycarbonate.

TABLE 7

EXTRUSION OF SOLUTION OF OLIGOMERIC POLYCARBONATE IN METHYL SALICYLATE, BMSC/(BPA and HQ) = 1.017, Catalyst = TBPA + NaOH

| Example | Vacuum level at Vent (in. Hg) | | | | | Mass Flow Rate (rpm)/(lb/hr) | Torque (%) | Melt Temperature (° C.) | Screw speed (rpm) | Die Pressure (psi) |
| --- | --- | --- | --- | --- | --- | --- | --- | --- | --- | --- |
| | V1 | V3 | V4 | V5 | V6 | | | | | |
| 31 | Atm | 21 | 21 | 21 | 25 | ~12 | 57 | 315 | 138 | 347 |
| 32 | Atm | 21 | 21 | 21 | 25 | ~12 | 58 | 306 | 138 | 637 |
| 33 | Atm | 21 | 21 | 21 | 23 | 30 | 16 | 301 | 138 | 251 |
| 34 | Atm | 21 | 21 | 21 | 24 | 20 | 31 | 288 | 138 | 250 |
| 35 | Atm | 21 | 21 | 21 | 25 | 36 | 14 | 285 | 138 | 181 |
| 36 | Atm | 22 | 22 | 22 | 25 | ~15 | 43 | 315 | 140 | 275 |
| 37 | Atm | 21 | 21 | 21 | 24 | 15 | 17 | 308 | 118 | 31 |

| Example | Actual Barrel Temperatures (° C.) | Molecular Weight Mw/Mn/PDI |
| --- | --- | --- |
| 31 | 245/271/271/301/321/320/332/331/270 | 30600/13000/2.4 |
| 32 | 239/271/270/300/311/310/311/311/270 | 34700/14800/2.3 |
| 33 | 233/261/261/296/308/310/308/309/270 | 22500/9800/2.3 |
| 34 | 235/271/267/289/289/290/288/288/270 | 22400/9700/2.3 |
| 35 | 233/266/262/287/289/289/289/270 | 19400/8900/2.2 |
| 36 | 237/272/267/291/311/310/331/330/270 | 29400/13400/2.2 |
| 37 | 239/273/267/313/311/311/331/330/271 | 18900/8800/2.1 |

Examples 31–37 illustrate the use of the present invention for the preparation of copolycarbonates.

TABLE 8

EXTRUSION OF SOLUTION OF OLIGOMERIC POLYCARBONATE IN METHYL SALICYLATE, BMSC/(BPA) = 1.03, Catalyst = TBPA ONLY

| Example | Vacuum @ Vents (in. Hg) | | | | | Mass Flow Rate (rpm)/(lb/hr) | Torque (%) | Melt Temperature (° C.) | Screw speed (rpm) | Die Pressure (psi) |
| --- | --- | --- | --- | --- | --- | --- | --- | --- | --- | --- |
| | V1 | V3 | V4 | V5 | V6 | | | | | |
| 38 | 12 | 28 | 28 | 29 | 29 | 40/17.6 | 38 | 289 | 201 | 155 |
| 39 | 12 | 28 | 28 | 29 | 29 | 40/17.6 | 38 | 289 | 201 | 159 |
| 40 | 12 | 28 | 28 | 29 | 29 | 40/17.6 | 39 | 289 | 201 | 166 |
| 41 | 12 | 28 | 28 | 29 | 29 | 40/17.6 | 39 | 289 | 201 | 173 |
| 42 | 12 | 28 | 28 | 29 | 29 | 40/17.6 | 39 | 290 | 201 | 177 |

TABLE 8-continued

EXTRUSION OF SOLUTION OF OLIGOMERIC POLYCARBONATE IN
METHYL SALICYLATE, BMSC/(BPA) = 1.03, Catalyst = TBPA ONLY

| | | | | | | | | | | |
|---|---|---|---|---|---|---|---|---|---|---|
| 43 | 12 | 28 | 28 | 29 | 29 | 40/17.6 | 40 | 290 | 201 | 183 |
| 44 | 12 | 25 | 28 | 29 | 29 | 40/17.6 | 39 | 291 | 201 | 192 |
| 45 | 12 | 25 | 28 | 29 | 29 | 40/17.6 | 39 | 292 | 201 | 181 |
| 46 | 14 | 28 | 28 | 29 | 29 | 40/17.6 | 41 | 292 | 201 | 188 |
| 47 | 14 | 28 | 28 | 29 | 29 | 40/17.6 | 41 | 292 | 201 | 209 |
| 48 | 14 | 28 | 28 | 29 | 29 | 40/17.6 | 42 | 292 | 201 | 214 |
| 49 | 14 | 28 | 28 | 29 | 29 | 40/17.6 | 42 | 293 | 201 | 214 |
| 50 | 14 | 28 | 28 | 29 | 29 | 40/17.6 | 42 | 293 | 201 | 200 |

| Example | Actual Barrel Temperatures (° C.) | Molecular Weight Mw/Mn/PDI | Residual MS (ppm) |
|---|---|---|---|
| 38 | 258/281/281/280/281/280/282/281/265 | 23194/10642/2.333 | 647.9 |
| 39 | 257/280/280/280/280/280/281/280/265 | 23551/10693/2.202 | 648 |
| 40 | 257/280/280/280/280/280/281/280/265 | 23978/10978/2.184 | 594.1 |
| 41 | 257/280/280/280/280/280/280/280/265 | 23926/11117/2.152 | 614.9 |
| 42 | 257/280/280/280/280/280/280/280/265 | 23861/10709/2.228 | 722 |
| 43 | 257/280/280/280/280/280/280/280/265 | 23961/10915/2.195 | 590.6 |
| 44 | 257/280/280/280/280/280/280/280/265 | 24318/11194/2.172 | 667 |
| 45 | 257/280/280/280/280/280/280/280/266 | 24192/11339/2.134 | 655.2 |
| 46 | 257/280/280/280/280/280/280/280/265 | 24348/11007/2.212 | 613.4 |
| 47 | 257/280/280/280/280/280/280/280/265 | 24717/11317/2.184 | 644.5 |
| 48 | 257/280/280/280/280/280/280/280/265 | 24826/11317/2.194 | 743.3 |
| 49 | 257/280/280/280/280/280/280/280/265 | 24987/11412/2.190 | 662.6 |
| 50 | 257/280/280/280/280/280/280/280/265 | 24878/11375/2.187 | 698 |

In Examples 38–50 a single batch of oligomeric polycarbonate in methyl salicylate solution was extruded and the polycarbonate which emerged from the extruder was sampled at six-minute intervals over the course of two hours.

In Examples 51–74 a solution of an oligomeric polycarbonate prepared as in Example 5 was extruded on the same devolatilizing extruder used in Examples 38–50. The ratio of BMSC to BPA was 1.02. Examples 51–71 demonstrate the level of consistency achieved. As in Examples 38–50, a single solution of oligomeric polycarbonate was fed to the extruder for a period of about 2 hours. Examples 51–74 represent samples of the product polycarbonate collected about every six minutes as the product polycarbonate emerged from the extruder. The molecular weight and level of residual methyl salicylate were determined for each sample. Examples 72–74 demonstrate that the process may be operated at higher feed rates than the 17.6 pounds of solution per hour used in Examples 51–71. Examples 72 and 73 demonstrate that feed rates as high as 35.1 and 41.6 pounds of solution per hour may be used without sacrificing the molecular weight of the product polycarbonate. Moreover, low levels of residual methyl salicylate may be maintained. Example 74 highlights the effect of screw speed on product polycarbonate molecular weight and the level of residual methyl salicylate contained in the product polycarbonate.

TABLE 9

EXTRUSION OF SOLUTION OF OLIGOMERIC POLYCARBONATE IN
METHYL SALICYLATE, BMSC/(BPA) = 1.02, Catalyst = TBPA ONLY

| Example | Vacuum @ Vents (in. Hg.) | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|
| | V1 | V3 | V4 | V5 | V6 | | | | |
| 51 | 15 | 28 | 28 | 29 | 29 | 40/17.6 | 65 | 302 | 200 | 477 |
| 52 | 15 | 28 | 28 | 29 | 29 | 40/17.6 | 65 | 304 | 199 | 486 |
| 53 | 15 | 28 | 28 | 29 | 29 | 40/17.6 | 66 | 304 | 199 | 506 |
| 54 | 15 | 28 | 28 | 29 | 29 | 40/17.6 | 67 | 304 | 199 | 488 |
| 55 | 15 | 28 | 28 | 29 | 29 | 40/17.6 | 67 | 305 | 199 | 496 |
| 56 | 15 | 28 | 28 | 29 | 29 | 40/17.6 | 66 | 305 | 199 | 504 |
| 57 | 15 | 28 | 28 | 29 | 29 | 40/17.6 | 67 | 305 | 199 | 507 |
| 58 | 15 | 28 | 28 | 29 | 29 | 40/17.6 | 67 | 306 | 199 | 521 |
| 59 | 15 | 28 | 28 | 29 | 29 | 40/17.6 | 67 | 306 | 199 | 512 |
| 60 | 15 | 28 | 28 | 29 | 29 | 40/17.6 | 67 | 306 | 199 | 519 |
| 61 | 15 | 28 | 28 | 29 | 29 | 40/17.6 | 67 | 307 | 199 | 523 |
| 62 | 15 | 28 | 28 | 29 | 29 | 40/17.6 | 67 | 307 | 199 | 550 |
| 63 | 15 | 28 | 28 | 29 | 29 | 40/17.6 | 67 | 308 | 199 | 500 |
| 64 | 15 | 28 | 28 | 29 | 29 | 40/17.6 | 67 | 308 | 199 | 524 |
| 65 | 15 | 28 | 28 | 29 | 29 | 40/17.6 | 67 | 308 | 199 | 496 |
| 66 | 15 | 28 | 28 | 29 | 29 | 40/17.6 | 67 | 308 | 199 | 550 |
| 67 | 15 | 28 | 28 | 29 | 29 | 40/17.6 | 67 | 308 | 199 | 535 |

TABLE 9-continued

EXTRUSION OF SOLUTION OF OLIGOMERIC POLYCARBONATE IN
METHYL SALICYLATE, BMSC/(BPA) = 1.02, Catalyst = TBPA ONLY

| 68 | 15 | 28 | 28 | 29 | 29 | 40/17.6 | 67 | 308 | 199 | 523 |
| 69 | 15 | 28 | 28 | 29 | 29 | 40/17.6 | 67 | 309 | 199 | 548 |
| 70 | 15 | 28 | 28 | 29 | 29 | 40/17.6 | 67 | 308 | 199 | 562 |
| 71 | 15 | 28 | 28 | 29 | 29 | 40/17.6 | 67 | 309 | 199 | 596 |
| 72 | 15 | 28 | 28 | 29 | 29 | 80/35.1 | 62 | 372 | 655 | |
| 73 | 15 | 28 | 28 | 29 | 29 | 95/41.6 | 53 | 365 | 655 | |
| 74 | 15 | 28 | 28 | 29 | 29 | 40/17.6 | 69 | 369 | 650 | |

| Example | Actual Barrel Temperatures (° C.) | Molecular Weight Mw/Mn/PDI | Residual MS (ppm) | % Endcap | Total OH/"MS" OH |
|---|---|---|---|---|---|
| 51 | 257/280x5/282/280/265 | 31417/14266/2.202 | 428.3 | | |
| 52 | 256/280x7/265 | 31470/13923/2.260 | | | |
| 53 | 255/280x7/265 | 31597/13989/2.259 | 481.7 | | |
| 54 | 255/280x7/265 | 31678/14010/2.261 | 476.3 | | |
| 55 | 255/280x7/265 | 31766/14063/2.259 | 486.7 | | |
| 56 | 255/280x7/265 | 32002/14136/2.264 | 532.6 | | |
| 57 | 256/280x2/281/280x4/265 | 32008/14354/2.230 | 477.5 | | |
| 58 | 256/280x7/265 | 32109/14409/2.228 | 434.5 | | |
| 59 | 256/280x7/265 | 32631/14369/2.271 | 569.6 | | |
| 60 | 256/280x7/265 | 32569/14352/2.269 | 470.9 | | |
| 61 | 256/280x7/265 | 32314/14225/2.272 | 499.2 | | |
| 62 | 257/280x7/265 | 32964/14524/2270 | 4775 | | |
| 63 | 256/280x6/281/266 | 32417/14293/2.268 | 604.4 | | |
| 64 | 256/280x6/281/265 | 32884/14464/2.274 | 509.5 | | |
| 65 | 256/280x7/265 | 32725/14394/2.274 | 513.8 | | |
| 66 | 256/280x7/265 | 32930/14499/2.271 | 493.2 | | |
| 67 | 256/280x7/265 | 33647/14571/2.309 | 493.1 | | |
| 68 | 256/280x7/265 | 33752/16821/2.007 | 535.8 | | |
| 69 | 256/280x7/265 | 32809/14406/2.277 | 527.2 | | |
| 70 | 256/280x7/265 | 32794/14363/2.283 | 505.9 | 97.9 | 49/16 |
| 71 | 256/280x7/265 | 33202/14488/2.292 | 529.6 | | |
| 72 | 256/280x7/265 | 33604/14619/2.299 | 309.9 | 98.5 | 36/10 |
| 73 | 256/280x7/265 | 33143/15448/2.145 | 416.9 | 97.7 | 51/13 |
| 74 | 256/280x7/265 | 35339/14654/2.412 | 62.6 | 99.2 | 19/0 |

In Table 9 the column heading "Total OH/"MS" OH" provides the total concentration of OH endgroups (expressed in ppm) present in the product polycarbonate (numerator) and the measured concentration of "salicyl-OH" groups ("MS" OH) expressed in parts per million (denominator). The data demonstrate very high levels of product polycarbonate endcapping. The product polycarbonate of example 70 was analyzed for the presence of residual monomer. Less than 350 ppm residual BMSC, and less than 20 ppm residual BPA were found in the product polycarbonate.

Examples 75–80 illustrate the method of the invention in which a chain stopper, p-cumylphenol was included in the equilibration step. Thus BMSC, BPA and p-cumylphenol (0.03 mole per mole BPA) were equilibrated as in Example 5 to provide a solution of an oligomeric polycarbonate in methyl salicylate. The molar ratio of BMSC to BPA was 1.03. As in Examples 38–50, a single solution of the oligomeric polycarbonate was fed to the extruder configured as in Examples 16–19. Examples 75–80 represent samples of the product polycarbonate which were collected at regular intervals over a period of about 1.5 hours. The molecular weight and level of residual methyl salicylate determined for each sample. Data for Examples 75–80 are gathered in Table 10 and demonstrate the successful use of a chain stopper to control molecular weight within the context of the present invention.

TABLE 10

EXTRUSION OF SOLUTION OF PCP-CHAINSTOPPED
OLIGOMERIC POLYCARBONATE IN METHYL SALICYLATE, PCP LEVEL =
0.03 MOLE PER MOLE BPA, BMSC/(BPA) = 1.03, Catalyst = TBPA ONLY

| | Vacuum @ Vents (in. Hg.) | | | | | Mass Flow Rate | Torque | Melt Temperature | Screw speed | Die Pressure |
|---|---|---|---|---|---|---|---|---|---|---|
| Example | V1 | V3 | V4 | V5 | V6 | (rpm)/(lb/hr) | (%) | (° C.) | (rpm) | (psi) |
| 75 | 15 | 25 | 25 | 29 | 29 | 40/17.6 | 20 | 282 | 125 | 65 |
| 76 | 22 | 28 | 27 | 29 | 29 | 40/17.6 | 30 | 288 | 200 | 60 |
| 77 | 22 | 28 | 28 | 29 | 29 | 40/17.6 | 35 | 296 | 299 | 40 |
| 78 | 22 | 28 | 28 | 29 | 29 | 40/17.6 | 39 | 304 | 402 | 35 |
| 79 | 22 | 28 | 28 | 29 | 29 | 40/17.6 | 41 | 311 | 503 | 32 |
| 80 | 25 | 28 | 28 | 29 | 29 | 30/13.2 | 34 | 288 | 201 | 65 |

TABLE 10-continued

EXTRUSION OF SOLUTION OF PCP-CHAINSTOPPED
OLIGOMERIC POLYCARBONATE IN METHYL SALICYLATE, PCP LEVEL =
0.03 MOLE PER MOLE BPA, BMSC/(BPA) = 1.03, Catalyst = TBPA ONLY

| Example | Actual Barrel Temperatures (° C.) | Molecular Weight Mw/Mn/PDI | Residual MS (ppm) |
|---|---|---|---|
| 75 | 264/278/280x5/282/265 | 19572/8847/2.212 | 1442.8 |
| 76 | 260/280x2/281x2/280/281x2/265 | 20298/9185/2.210 | 1158.7 |
| 77 | 257/280/281x3/280/283/282/265 | 20546/9315/2.206 | 934.5 |
| 78 | 254/280/281x3/280/284/281/265 | 20922/9486/2.206 | 723.7 |
| 79 | 253/280/281x2/282/280/285/282/265 | 21007/9516/2.208 | 595.5 |
| 80 | 257/280/279x2/278/280/274/277/264 | 21718/9839/2.207 | 619.9 |

Examples 81–86 illustrate the use of the method of the invention to obtain a polycarbonate comprising methyl salicyl endgroups and a very low level of residual solvent in a single extrusion step. Thus BMSC and BPA were equilibrated as in Example 5 to provide a solution of an oligomeric polycarbonate in methyl salicylate. The molar ratio of BMSC to BPA was 1.035. As in Examples 38–50, a single solution of the oligomeric polycarbonate was fed to the extruder configured as in Examples 16–19. Examples 81–86 represent samples of the product polycarbonate which were collected at regular intervals over a period of about 1.5 hours. The molecular weight and level of residual methyl salicylate were determined for each sample. Data for Examples 81–86 are gathered in Table 11 and demonstrate that still lower levels of residual methyl salicylate can be achieved by increasing the melt temperature and screw speed. The product polycarbonate was very clear and colorless throughout the experiment giving rise to the Examples in Table 11.

Examples 87–90 further illustrate the use of the method of the invention to obtain a polycarbonate comprising methyl salicyl endgroups and a very low level of residual solvent in a single extrusion step in the context of a still higher initial molar ratio of BMSC to BPA. BMSC and BPA were equilibrated as in Example 5 to provide a solution of an oligomeric polycarbonate in methyl salicylate. The molar ratio of BMSC to BPA was 1.0375. As in Examples 38–50, a single solution of the oligomeric polycarbonate was fed to the extruder configured as in Examples 16–19. Examples 87–90 represent samples of the product polycarbonate which were collected at regular intervals over a period of about 1.5 hours. The molecular weight and level of residual methyl salicylate determined for each sample. Data for Examples 87–90 are gathered in Table 12 and demonstrate that very low levels of residual methyl salicylate can be achieved by increasing the melt temperature and screw speed. The lower molecular weight of the product polycarbonate reflects the higher level of BMSC employed. The product polycarbonate was very clear and colorless throughout the experiment giving rise to the Examples in Table 12.

TABLE 11

EFFECT OF SCREW SPEED AND MELT TEMPERATURE ON
PRODUCT POLYCARBONATE. EXTRUSION OF OLIGOMERIC
POLYCARBONATE IN METHYL SALICYLATE, BMSC/(BPA) = 1.035, Catalyst =
TBPA ONLY

| Example | Vacuum @ Vents (in. Hg.) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 81 | 15 | 28 | 28 | 29 | 29 | 40/17.6 | 35 | 294 | 251 | 31 |
| 82 | 15 | 28 | 28 | 29 | 29 | 40/17.6 | 26 | 281 | 125 | 56 |
| 83 | 15 | 28 | 28 | 29 | 29 | 40/17.6 | 42 | 304 | 378 | 17 |
| 84 | 15 | 28 | 28 | 29 | 29 | 40/17.6 | 43 | 315 | 500 | 12 |
| 85 | 25 | 28 | 28 | 29 | 29 | 40/17.6 | 47 | 324 | 630 | 8 |
| 86 | 15 | 28 | 28 | 29 | 29 | 99/43.4 | 37 | 324 | 630 | 66 |

| Example | Actual Barrel Temperatures (° C.) | Molecular Weight Mw/Mn/PDI | Residual MS (ppm) |
|---|---|---|---|
| 81 | 255/279/272/280/281/280/285/282/280 | 21711/9728/2.232 | 298.9 |
| 82 | 257/280/272/279/279/280/277/278/279 | 21815/9760/2.235 | 583.7 |
| 83 | 255/281/275/281x4/283/281 | 22417/10012/2.239 | 165.4 |
| 84 | 254/281/279/282x2/280/285/284/281 | 22589/9487/2.381 | 102.5 |
| 85 | 252/282/283x3/280/288/283/281 | 22874/10196/2.243 | 66.2 |
| 86 | 248/273/274/276/279/280/286/283/281 | 21689/9692/2.238 | 40.9 |

TABLE 12

EFFECT OF SCREW SPEED AND MELT TEMPERATURE ON
PRODUCT POLYCARBONATE. EXTRUSION OF OLIGOMERIC
POLYCARBONATE IN METHYL SALICYLATE, BMSC/(BPA) = 1.0375, Catalyst =
TBPA ONLY

| Example | Vacuum @ Vents (in. Hg.) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 87 | 15 | 28 | 28 | 29 | 29 | 40/17.6 | 15 | 276 | 125 | TLTM* |
| 88 | 17 | 28 | 28 | 29 | 29 | 40/17.6 | 25 | 282 | 250 | TLTM |
| 89 | 20 | 28 | 28 | 29 | 29 | 40/17.6 | 30 | 290 | 374 | TLTM |
| 90 | 21 | 28 | 28 | 29 | 29 | 40/17.6 | 33 | 297 | 501 | TLTM |

| Example | Actual Barrel Temperatures (° C.) | Molecular Weight Mw/Mn/PDI | Residual MS (ppm) |
|---|---|---|---|
| 87 | 259/269/266/279/280x2/282/280/266 | 16233/7385/2.198 | 588 |
| 88 | 253/281/277/280x5/265 | 16500/7706/2.141 | 262 |
| 89 | 250/280/281x3/280/282/281/265 | 17008/7182/2.368 | 93.1 |
| 90 | 249/280/281x3/280/283/281/265 | 17149/7773/2.206 | 59.1 |

*TLTM = too low to measure.

Examples 91–94 illustrate the preparation of copolycarbonates using the method of the present invention. The copolycarbonates are characterized as having a high level of methyl salicyl endgroups, very low Fries group concentrations, and a low level of residual solvent. The solution of oligomeric copolycarbonate employed in Examples 91–93 was prepared as follows. A mixture of hydroquinone (0.2 moles HQ per 0.8 mole BPA), BPA and BMSC (1.02 moles BMSC per 0.8 mole of BPA) was equilibrated as in Example 5. TBPA (2.5×10$^{-4}$ moles TBPA per 0.8 mole BPA) was used as the catalyst to provide a solution of an oligomeric copolycarbonate in methyl salicylate. The molar ratio of BMSC to BPA+HQ was 1.02. The solution of oligomeric polycarbonate used in Example 94 was prepared as follows. A mixture of hydroquinone (0.35 moles HQ per 0.65 mole BPA), BPA and was equilibrated as in Example 5. TBPA (2.5×10$^{-4}$ moles TBPA per 0.65 mole BPA) was used as the catalyst to provide a solution of an oligomeric copolycarbonate in methyl salicylate. The molar ratio of BMSC to BPA+HQ was 1.015. The two solutions were fed sequentially to an extruder configured as in Examples 16–19. Examples 91–94 represent samples of the product copolycarbonate which were collected at regular intervals over a period of about 1.5 hours. The molecular weight and level of residual methyl salicylate were determined for each sample. Data for Examples 91–94 are gathered in Table 13 and demonstrate the formation of copolycarbonates using the method of the present invention. The product copolycarbonates were clear but had a slightly yellow color.

TABLE 13

COPOLYCARBONATES OF BPA & HQ BMSC/(BPA + HQ) = 1.02
(EXAMPLES 91–93), AND 1.015 (EXAMPLE 94), Catalyst = TBPA ONLY

| Example | Vacuum @ Vents (in. Hg.) | | | | | Mass Flow Rate (rpm)/(lb/hr) | Torque (%) | Melt Temperature (° C.) | Screw speed (rpm) | Die Pressure (psi) |
|---|---|---|---|---|---|---|---|---|---|---|
| | V1 | V3 | V4 | V5 | V6 | | | | | |
| 91 | 15 | 28 | 28 | 29 | 29 | 40/17.6 | 52 | 296 | 127 | 447 |
| 92 | 15 | 28 | 28 | 29 | 29 | 50/22.0 | 53 | 315 | 250 | 356 |
| 93 | 15 | 28 | 28 | 29 | 29 | 50/22.0 | 51 | 329 | 375 | 254 |
| 94 | 21 | 28 | 28 | 29 | 29 | 40/17.6 | 57 | 316 | 298 | 325 |

| Example | Actual Barrel Temperatures (° C.) | Molecular Weight Mw/Mn/PDI | Residual MS (ppm) |
|---|---|---|---|
| 91 | 229/282/272/280/279/280/278/278/280 | 30355/13295/2.283 | 1241.5 |
| 92 | 234/280/272/280x3/281/282/281 | 30242/13320/2.270 | 1076 |
| 93 | 244/280/273/281x3/283x2/281 | 30429/13338/2.281 | 1048.6 |
| 94 | 250/280/276/280x3/281/278/279 | 30156/13012/2.318 | 761.1 |

Examples 95–97 illustrate the use of the method of the present invention for the preparation of copolycarbonates containing about 30 mole percent polycarbonate repeat units are derived from biphenol (BP=4,4'-dihydroxybiphenyl) and about 70 mole percent are derived from bisphenol A (BPA). The solution of oligomeric copolycarbonate employed in Examples 95–97 was prepared as follows. A mixture of biphenol (0.3 moles BP per 0.7 mole BPA), BPA and BMSC (1.015 moles BMSC per 0.7 mole of BPA) was equilibrated as in Example 5. TBPA (2.5×10$^{-4}$ moles TBPA per 0.7 mole BPA) was used as the catalyst to provide a solution of an oligomeric copolycarbonate in methyl salicylate. The molar ratio of BMSC to the total number of moles of BPA+HQ was 1.015. The solution was fed to a devolatilizing extruder configured as in Examples 16–19. Examples 95–97 represent samples of the product copolycarbonate which were collected at regular intervals over a period of about 1.5 hours. The molecular weight and level of residual methyl salicylate were determined for each sample. Data for Examples 95–97 are gathered in Table 14 and are consistent with the formation of copolycarbonates comprising both BP and BPA residues. The product copolycarbonate samples were clear and had no visible yellowness. The molecular weights observed for the copolycarbonate samples were lower than anticipated, prompting a post extrusion examination of the reaction vessel in which the initial equilibration of monomers was conducted. It was observed that some of the biphenol, a relatively insoluble dihydroxy aromatic compound, did not dissolve during the equilibration reaction. This effectively gave a molar ratio of BMSC to the combined number of moles of BP and BPA which was higher than 1.015. The molecular weights observed for the product polycarbonates are more consistent with a molar ratio of BMSC to BP+BPA of about 1.037. (See for example, the data provided in Table 12 for the preparation of bisphenol A polycarbonate in which the molar ratio of BMSC to BPA was 1.0375.)

tion of oligomeric copolycarbonate employed in Examples 98–99 was prepared as follows. A mixture of 4,4'-sulfonyldiphenol (0.2 moles BPS per 0.8 mole BPA), BPA and BMSC (1.02 moles BMSC per 0.8 mole of BPA) was equilibrated as in Example 5. TBPA ($2.5 \times 10^{-4}$ moles TBPA per 0.8 mole BPA) was used as the catalyst to provide a solution of an oligomeric copolycarbonate in methyl salicylate. The molar ratio of BMSC to BPA+BPS was 1.02. The solution of oligomeric polycarbonate used in Examples 100–101 was prepared as follows. A mixture of BPS (0.40 moles BPS per 0.60 mole BPA), BPA and BMSC (1.022 moles BMSC per 0.6 mole of BPA) was equilibrated as in Example 5. TBPA ($2.5 \times 10^{-4}$ moles TBPA per 0.60 mole BPA) was used as the catalyst to provide a solution of an oligomeric copolycarbonate in methyl salicylate. The molar ratio of BMSC to BPA+BPS was 1.022. The two solutions were fed sequentially to an extruder configured as in Examples 16–19. Examples 98–101 represent samples of the product copolycarbonate which were collected at regular intervals over a total time period of about 3.0 hours. The molecular weight and level of residual methyl salicylate were determined for each sample. Data for Examples 9

TABLE 14

COPOLYCARBONATES: 70% BPA & 30% BIPHENOL (BP)
BMSC/(BPA + BP) = 1.015. Catalyst = TBPA ONLY

| Example | Vacuum @ Vents (in. Hg.) | | | | | Mass Flow Rate | Torque | Melt Temperature | Screw speed | Die Pressure |
|---|---|---|---|---|---|---|---|---|---|---|
| | V1 | V3 | V4 | V5 | V6 | (rpm)/(lb/hr) | (%) | (° C.) | (rpm) | (psi) |
| 95 | 24 | 28 | 28 | 29 | 29 | 40/17.6 | 45 | 302 | 350 | 106 |
| 96 | 24 | 28 | 28 | 29 | 29 | 40/17.6 | 44 | 302 | 350 | 94 |
| 97 | 26 | 28 | 28 | 29 | 29 | 40/17.6 | 42 | 300 | 401 | 40 |

| Example | Actual Barrel Temperatures (° C.) | Molecular Weight Mw/Mn/PDI | Residual MS (ppm) |
|---|---|---|---|
| 95 | 256/305/284/282/281/280/283/281/265 | 19691/9264/2.125 | 1835 |
| 96 | 261/302/290/280x3/281/280/265 | 19415/9031/2.150 | 2004 |
| 97 | 263/300/290/280x5/265 | 17867/8486/2.105 | 1942 |

Examples 98–101 illustrate the use of the method of the present invention for the preparation of copolycarbonates containing polycarbonate repeat units derived from 4,4'-sulfonyldiphenol (BPS) and bisphenol A (BPA). The solu- 8–101 are gathered in Table 15 and are consistent with the formation of copolycarbonates comprising both BPA and BPS derived repeat units using the method of the present invention.

TABLE 15

COPOLYCARBONATES: 20% and 40% 4,4'-SULFONYLDIPHENOL
(BPS) BMSC/(BPA + BPS) = 1.02–1.022, Catalyst = TBPA ONLY

| Example | Vacuum @ Vents (in. Hg.) | | | | | Mass Flow Rate | Torque | Melt Temperature | Screw speed | Die Pressure |
|---|---|---|---|---|---|---|---|---|---|---|
| | V1 | V3 | V4 | V5 | V6 | (rpm)/(lb/hr) | (%) | (° C.) | (rpm) | (psi) |
| 98 | 15 | 28 | 28 | 29 | 29 | 40/17.6 | 80 | 324 | 200 | 744 |
| 99 | 15 | 28 | 28 | 29 | 29 | 40/17.6 | 79 | 323 | 200 | 690 |
| 100 | 16 | 28 | 28 | 29 | 29 | 35/15.4 | 76 | 334 | 225 | 615 |
| 101 | 17 | 28 | 28 | 29 | 29 | 35/15.4 | 80 | 330 | 201 | 694 |

| Example | Actual Barrel Temperatures (° C.) | Molecular Weight Mw/Mn/PDI | Residual MS (ppm) |
|---|---|---|---|
| 98 | 246/280/279/280x3/273/280x2 | 37069/15446/2.40 | 556 |
| 99 | 251/280x5/281/280/280 | 37031/15227/2.43 | 522 |
| 100 | 249/281/280/281x2/280/286/281/281 | 39014/13708/2.85 | 578 |
| 101 | 252/280x8 | 38194/13843/2.76 | 563 |

Example 102

A solution of oligomeric polycarbonate is prepared as in Example 5 and is heated to a temperature of about 160° C. in a feed tank under a nitrogen atmosphere (50–60 psig $N_2$). Nitrogen is used to provide enough pressure to feed the pump head of a gear pump in communication with the feed tank by means of heated transfer lines. Additionally, the polymer-solvent mixture further comprises the commercial stabilizers IRGAFOS 168 (about 0.12 percent by weight based on the weight of the oligomeric polycarbonate) and IRGANOX 1010 (about 0.10 percent by weight based on the weight of the oligomeric polycarbonate). The solution is transferred from the heated feed tank by means of the gear pump at a rate of about 30 pounds of solution per hour to a heat exchanger maintained at about 265° C. The solution emerges from the heat exchanger at a temperature of about 240° C. and is then fed through a pressure control valve plumbed into the upstream edge of barrel 3 of a 10-barrel, 25 mm diameter, co-rotating, intermeshing twin-screw extruder having a length to diameter ratio (L/D) of about 56. The cracking pressure of the pressure release valve is electronically controlled such that a steady stream of the superheated solution of the oligomeric polycarbonate is introduced into the extruder, the heated zones of which are maintained at a temperatures in a range between about 260° C. and about 290° C. The feed rate to the extruder is about 30 pounds per hour. The transfer lines between the heat exchanger and the pressure control valve are heated such that the temperature of the solution as it is introduced into the extruder through the pressure control valve is about 20° C. higher than the boiling point of methyl salicylate (boiling point 221° C.). The extruder is operated at a screw speed of about 460 rpm. The extruder is further equipped at barrel two with a side feeder positioned orthogonal to the barrel of the extruder. The side feeder is not heated, has an L/D of about 10, and comprises two screws consisting of forward conveying elements only. At the end most distant from the extruder barrel, the side feeder is equipped with a single atmospheric vent (V1). The conveying elements of the screws of the side feeder are configured to convey toward the extruder and away from the side feeder vent. The extruder is further equipped with two additional atmospheric vents at barrel 1 (V2) and barrel 4 (V3) and vacuum vents (vents operated at subatmospheric pressure) at barrel 6 (V4) and barrel 8 (V5). The three atmospheric vents, two on the extruder and one on the side feeder, are each connected to a solvent removal and recovery manifold comprising solvent vapor removal lines, a condenser and liquid solvent receiving vessel. The vacuum vents are similarly adapted for solvent recovery. Recovered ester substituted phenol may be purified by distillation or other means and recycled to prepare additional ester substituted diaryl carbonate. The extruder screw elements consist of both conveying elements and kneading elements. All of the conveying elements in both the extruder and the side feeder are forward flighted conveying elements. Kneading elements include neutral, forward flighted and rearward flighted kneading elements depending on function. In barrels 2 and 3 of the extruder, kneading blocks consisting of forward and neutral flighted kneading elements are employed. The extruder screws are equipped with melt seals consisting of kneading blocks made up of rearward flighted kneading elements. The melt seals are located at barrels 5, and 7. The vacuum vents are located downstream of the melt seals on barrel 6 and barrel 8 and are operated at vacuum levels of about 28 inches of mercury (a vacuum gauge indicating full vacuum, or zero absolute pressure, would read about 30 inches of mercury).

The product polycarbonate which emerges from the die face (melt temperature about 325° C.) of the extruder is stranded and pelletized. The pelletized product polycarbonate is found to have a weight average molecular weight, $M_w$, in excess of about 20000 daltons (GPC analysis) and to contain less than about 1 percent by weight residual ester substituted phenol. The product polycarbonate has a high level of endcapping and contains less than about 100 ppm Fries product.

General Procedure for Examples 103–181

A 30-gallon titanium reactor was used to melt the monomers, to mix the molten monomers with the catalyst and to pre-react (equilibrate) the monomers in the presence of the catalyst to form a solution comprising oligomeric polycarbonate dissolved in methyl salicylate. The heat needed for the melting of the monomers and the heating of the resulting solution to the desired temperature was provided by a stream of heating oil heated to about 210° C. which could be circulated inside the heating jacket of the reactor. The reactor could be pressurized to about 80 psi of absolute pressure with nitrogen gas. The reactor was also adapted for operation under vacuum, for use in those cases where a portion of the methyl salicylate by-product produced in the equilibration reaction was removed from the solution prior to its introduction into the devolatilizing extruder. The reaction vessel was connected to a shell-and-tube condenser attached to a receiver and vacuum outlet. Methyl salicylate distilled from, the reaction vessel was collected in the receiver. The receiver was mounted on a sensitive scale that monitored and measured the amount of methyl salicylate removed from the reactor in those instances when stripping was performed. A high power agitator inside the reactor was used to homogenize the initial reactive mixture of monomers and catalyst. The agitator could also be used to mix in additional monomers and catalyst during the operation of the process. Efficient mixing was found to be advantageous in experiments in which an inorganic filler, such as fumed silica or nanoclays was to be incorporated into the product polycarbonate. The agitator provided a uniform dispersion of the inorganic filler in the solution of the bligomeric polycarbonate in methyl salicylate prior to its introduction into the extruder and conversion to high molecular weight polycarbonate comprising the inorganic filler. A positive displacement, gear-type, pump, connected to the bottom of the reactor was used to transfer the solution of oligomeric polycarbonate in methyl salicylate from the reactor to the extruder at the desired rate. In some instances a 10-foot long, double-tube heat exchanger was inserted between the pump and the extruder in order to control the temperature of the solution of oligomeric polycarbonate. Typically, the temperature of the solution introduced into the extruder was between about 170° C. and 250° C. A pressure control valve (RESEARCH pressure control valve available from Badger Meter Inc.), hard-plumbed to the extruder at barrel No. 1, was located immediately downstream of the heat exchanger. The pressure control valve was used to isolate the extruder from the feed delivery system. The feed delivery system and the extruder were typically operated at different pressures. Thus, the feed delivery system on the upstream side of the pressure control valve was typically operated at a positive pressure while the pressure in the feed inlet zone of the extruder was typically below atmospheric pressure. The "set" or "cracking" pressure of the valve could be adjusted based on the discharge temperature of the solution exiting the heat exchanger, with higher solution temperatures typically requiring higher set pressures to control the rate of methyl salicylate flash evaporation as the solution of oligomeric polycarbonate encountered the feed inlet zone of the extruder. The extruder was a ZSK 25 mm co-rotating, intermeshing twin-screw extruder having 14 barrels and a length to diameter ratio (L/D) of about 56. The extruder was equipped with six vent ports, V1–V6 which could be operated at different levels of vacuum in order to remove the substantial amounts of the methyl salicylate solvent present in each solution of oligomeric polycarbonate employed. The absolute pressure at these vent ports was adjusted to balance devolatilization efficiency with the possibility of foaming of the solution due to the sudden vaporization of the solvent. Vent ports V1 and V2 were operated under slight vacuum whereas vent ports V3–V6 were operated under full vacuum. Vent ports V1–V6 were located along the length of the extruder at barrel 4 (V1), barrel 5 (V2), barrel 7 (V3), barrel 9 (V4), barrel 11 (V5), and barrel 13 (V6) respectively. The screw configuration used is shown in FIG. 2.

In Examples 103–105 the catalyst, tetrabutylphosphonium acetate (TBPA) was used in an amount corresponding to about $2.5 \times 10^{-4}$ moles of catalyst per mole of bisphenol A employed. A mixture of BMSC (1.02 mole per mole BPA), BPA and catalyst was charged to the reactor and heated to a temperature of about 180° C. for a period of about 1 hour to achieve a homogeneous solution in methyl salicylate of an oligomeric BPA polycarbonate comprising methyl salicyl endgroups corresponding to structure II. The solution was about 55 percent by weight methyl salicylate. The solution was transferred using a gear pump through a heat exchanger and pressure control valve into the inlet zone of the devolatilizing extruder. The solution which emerged from the heat exchanger had a temperature about 9 to 16 degrees higher than the temperature of the solution in the reactor. Extruder vent port pressures, rate of introduction of the solution into the extruder (See "Mass Flow Rate (lb/hr)" Table 16) and other operating conditions are given in Table 16. The vent port pressure for vent 2 (V2) (not shown ) was identical to that of V1. The column heading "Die P (psi)" indicates the pressure measured at the extruder die face.

The data for Examples 103–105 indicate that the high molecular weight polycarbonate was achieved under the extruder conditions selected. Moreover, residual methyl salicylate (MS) solvent levels (See "Residual MS (ppm)" in Table 16) in the product polycarbonate samples are low. The product polycarbonate is highly (95 to 96%) endcapped (See "% Endcap" in Table 16). Free hydroxyl groups present in the product polycarbonate were shown by $^{31}$P-NMR to be attached to terminal bisphenol A groups (See "BPA OH (ppm)" and terminal salicyl groups (i.e. groups having structure IX) (See "Salicyl OH (ppm) in Table 16).

Examples 106–109 were carried out as in Examples 103–105 with the exception that the catalyst employed was a combination of $2.5 \times 10^{-4}$ moles of tetramethylammonium hydroxide (TMAH) and $1 \times 10^{-6}$ moles of sodium hydroxide per mole of BPA employed. Data for the extruder conditions employed and product polycarbonate properties is given in Table 17 below. The data in Table 17 demonstrate that high molecular weight BPA polycarbonate comprising methyl salicyl terminal groups II may be achieved under the extruder conditions selected using a combination of TMAH and sodium hydroxide as the transesterification catalyst.

TABLE 16

BISPHENOL A HOMOPOLYCARBONATES: BMSC/BPA = 1.02, Catalyst = TBPA ONLY

| Example | Vacuum @ Vents (in. Hg.) | | | | | Mass Flow Rate (lb/hr) | Torque (%) | Melt (° C.) | Screw speed (rpm) | Die P (psi) | T feed in Reactor (° C.) | T feed before P. Value (° C.) |
|---|---|---|---|---|---|---|---|---|---|---|---|---|
| | V1 | V3 | V4 | V5 | V6 | | | | | | | |
| 103 | 13 | 28 | 28 | 29 | 29 | 25 | 56 | 304 | 194 | 283 | 179 | 188 |
| 104 | 13 | 25 | 28 | 29 | 29 | 25 | 54 | 301 | 179 | 298 | 179 | 188 |
| 105 | 16 | 28 | 28 | 29 | 29 | 20 | 58 | 300 | 150 | 285 | 176 | 192 |

| Example | Actual Barrel Temperatures (° C.) | Mw/Mn | Residual MS (ppm)[1] | BPA OH (ppm)[1] | Salicyl OH (ppm)[1] | % Endcap |
|---|---|---|---|---|---|---|
| 103 | 251/281/280x6/281 | 29669/13122 | 1133 | 88 | 21 | 96 |
| 104 | 254/280x5/278/279/280 | 29896/13239 | 1176 | 105 | 30 | 95 |
| 105 | 251/281x2/280x3/279x2/280 | 31597/13912 | 851 | 82 | 27 | 96 |

[1]Determined by $^{31}$P-NMR

TABLE 17

BISPHENOL A HOMOPOLYCARBONATES: BMSC/BPA = 1.02,
Catalyst = TMAH and NaOH

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Value (° C.) |
|---|---|---|---|---|---|---|---|---|---|---|---|---|
| | V1 | V3 | V4 | V5 | V6 | | | | | | | |
| 106 | 16 | 28 | 28 | 29 | 29 | 20 | 69 | 303 | 130 | 564 | 180 | 182 |
| 107 | 16 | 28 | 28 | 29 | 29 | 20 | 73 | 309 | 130 | 702 | 182 | 182 |
| 108 | 17 | 28 | 28 | 29 | 29 | 20 | 74 | 310 | 130 | 781 | 175 | 181 |
| 109 | 17 | 28 | 28 | 29 | 29 | 20 | 77 | 311 | 130 | 770 | 172 | 179 |

| Example | Actual Barrel Temperatures (° C.) | Mw/Mn/PDI | Residual MS (ppm)[1] |
|---|---|---|---|
| 106 | 255/280x8 | 31481/13033/2.415 | 980 |
| 107 | 257/280x8 | 33766/14490/2.330 | 922 |
| 108 | 258/280x8 | 34787/15086/2.306 | 1066 |
| 109 | 259/281/280x7 | 34875/14052/2.482 | 1063 |

[1]Determined by GPC

Examples 110–112 were carried out on an extruder configured as in Examples 103–105 and illustrate the use of the method of the present invention to prepare copolycarbonates. The starting monomers; BPA, hydroquinone (HQ), and BMSC were charged to the reactor together with the transesterification catalyst tetrabutylphosphonium acetate TBPA, $1.0 \times 10^{-4}$ mole per mole BPA and HQ combined). The mixture was heated and stirred under a nitrogen atmosphere for about 1 hour at about 195° C. to produce a solution of an oligomeric polycarbonate comprising BPA structural units, HQ structural units, and methyl salicyl endgroups having structure II. The molar ratio of hydroquinone to total bisphenol (moles BPA+HQ combined) was about 0.4 and the ratio of moles BMSC to the moles of BPA and HQ combined was about 1.015. The polycarbonate emerging from the die face was pelletized and characterized. Molecular weights were determined by gel permeation chromatography.

Examples 113–115 were carried out on an extruder configured as in Examples 103–105 and illustrate the use of the method of the present invention to prepare copolycarbonates comprising structural units derived from methylhydroquinone and BPA. The starting monomers; BPA, methylhydroquinone (MeHQ), and BMSC were charged to the reactor together with the transesterification catalyst tetrabutylphosphonium acetate (TBPA, $1.0 \times 10^{-4}$ mole per mole BPA and MeHQ combined). The mixture was heated to between about 175 and about 190° C. and stirred under a nitrogen atmosphere for about 1 hour to produce a solution of an oligomeric polycarbonate comprising BPA structural units, MeHQ structural units, and methyl salicyl endgroups having structure II. The molar ratio of methylhydroquinone to total bisphenol (BPA+MeHQ) was about 0.9 and the ratio of moles BMSC to the moles of BPA and MeHQ combined was about 1.02. The transparent, slightly darkened polycarbonate emerging from the die face was pelletized and characterized. Molecular weights were determined by gel permeation chromatography.

TABLE 18

BISPHENOL A-HYDROQUINONE COPOLYCARBONATES:
BMSC/(BPA + HQ) = 1.015, Catalyst = TBPA ONLY,
HQ/(HQ + BPA) = 0.40

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Value (° C.) |
|---|---|---|---|---|---|---|---|---|---|---|---|---|
| | V1 | V3 | V4 | V5 | V6 | | | | | | | |
| 110 | 20 | 28 | 28 | 29 | 29 | 20 | 40 | 303 | 201 | 89 | 195 | 203 |
| 111 | 20 | 28 | 28 | 29 | 29 | 20 | 32 | 298 | 201 | 140 | 195 | 203 |
| 112 | 20 | 28 | 28 | 29 | 29 | 20 | 22 | 292 | 202 | 89 | 194 | 203 |

| Example | Actual Barrel Temperatures (° C.) | Mw/Mn | Residual MS (ppm)[1] | BPA OH (ppm)[2] | HQ OH (ppm)[2] | Salicyl OH (ppm)[2] | % Endcap |
|---|---|---|---|---|---|---|---|
| 110 | 266/280x5/283/280x2 | 25978/11411 | 1624.8 | 364 | 268 | 157 | 73 |
| 111 | 264/280x5/279/279/280 | 22091/9666 | 1987.5 | 499 | 353 | 258 | 68 |
| 112 | 262/280x8 | 19071/8033 | 1590.8 | 673 | 441 | 384 | 65 |

[1]Determined by GPC
[2]Determined by $^{31}$P-NMR

TABLE 19

BPA-METHYLHYDROQUINONE COPOLYCARBONATES:
BMSC/(BPA + MeHQ) = 1.02, Catalyst = TBPA, MeHQ/(BPA + MeHQ) = 0.9

| Example | Vacuum @ Vents (in. Hg.) | | | | | Solution Mass Flow Rate (lb/hr) | Torque (%) | Melt (° C.) | Screw speed (rpm) | T feed in Reactor (° C.) | T feed before P. Valve (° C.) |
|---|---|---|---|---|---|---|---|---|---|---|---|
| | $V_1$ | $V_3$ | $V_4$ | $V_5$ | $V_6$ | | | | | | |
| 113 | 25 | 28 | 28 | 29 | 29 | 20 | 36 | 294 | 201 | 188 | 179 |
| 114 | 25 | 28 | 28 | 29 | 29 | 20 | 36 | 295 | 201 | 184 | 194 |
| 115 | 28 | 28 | 28 | 29 | 29 | 20 | 40 | 300 | 251 | 173 | 190 |

| Example | Actual Barrel Temperatures (C.) | Mw/Mn/PDI | Residual MS (ppm)[1] |
|---|---|---|---|
| 113 | 252/280x5/284/280x2 | 24818/10530/2.357 | 1525 |
| 114 | 251/280x5/279/280x2 | 26949/11385/2.367 | 1466 |
| 115 | 250/280x2/281/280x2/281x2/280 | 29145/11871/2.455 | 1078 |

[1]Determined by GPC

Examples 116–117 were carried out on an extruder configured as in Examples 103–105 and illustrate the use of the method of the present invention to prepare copolycarbonates comprising structural units derived from methylhydroquinone and BPA. The starting monomers; BPA, methylhydroquinone (MeHQ), and BMSC were charged to the reactor together with the transesterification catalyst tetramethylammonium hydroxide (TMAH, $2.5 \times 10^{-4}$ mole per mole BPA and MeHQ combined) and sodium hydroxide (NaOH, $1 \times 10^{-6}$ moles NaOH per mole BPA and MeHQ combined). The mixture was heated to about 185° C. and stirred under a nitrogen atmosphere for about 1 hour to produce a solution of an oligomeric polycarbonate comprising BPA structural units, MeHQ structural units, and methyl salicyl endgroups having structure II. The molar ratio of methylhydroquinone to total bisphenol (moles BPA+MeHQ) was about 0.8 and the ratio of moles BMSC to the moles of BPA and MeHQ combined was about 1.015. The transparent, slightly pinkish polycarbonate emerging from the die face was pelletized and characterized. Molecular weights were determined by gel permeation chromatography.

Examples 118–120 were carried out on an extruder configured as in Examples 103–105 and illustrate the use of the method of the present invention to prepare copolycarbonates comprising structural units derived from hydroquinone and BPA. The starting monomers, BPA, hydroquinone (HQ), and BMSC were charged to the reactor together with the transesterification catalyst tetramethylammonium hydroxide (TMAH, $2.5 \times 10^{-4}$ mole per mole BPA and HQ combined) and sodium hydroxide (NaOH, $2 \times 10^{-6}$ moles NaOH per mole BPA and HQ combined). The mixture was heated to about 175° C. and stirred under a nitrogen atmosphere for about 1 hour to produce a solution of an oligomeric polycarbonate comprising BPA structural units, HQ structural units, and methyl salicyl endgroups having structure II. The molar ratio of hydroquinone to BPA was about 2 to 8 and the ratio of moles BMSC to the moles of BPA and HQ combined was about 1.024. The transparent, water-white polycarbonate emerging from the die face was pelletized and characterized. Molecular weights were determined by gel permeation chromatography. In Table 21 the abbreviation "TLTM" means "too low to measure".

TABLE 20

BPA-MeHQ COPOLYCARBONATES: BMSC/(BPA + MeHQ) = 1.015,
Catalyst = TMAH-NaOH, MeHQ/(BPA + MEHQ) = 0.8

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 116 | 20 | 28 | 28 | 29 | 29 | 20 | 57 | 303 | 145 | 66 | 186 | 187 |
| 117 | 21 | 28 | 28 | 29 | 29 | 25 | 44 | 303 | 177 | 122 | 183 | 184 |

| Example | Actual Barrel Temperatures (C.) | Mw/Mn/PDI | Residual MS (ppm)[1] |
|---|---|---|---|
| 116 | 246/280/281x2/280x2/286/281x2 | 45341/19373/2.340 | 571 |
| 117 | 243/280x5/279/280x2 | 33964/15199/2.235 | 1203.8 |

[1]Determined by GPC

TABLE 21

BISPHENOL A-HYDROQUINONE COPOLYCARBONATES:
BMSC/(BPA + HQ) = 1.024, Catalyst = TMAH-NaOH, HQ/(BPA + HQ) = 0.2

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 118 | 19 | 28 | 26 | 29 | 29 | 20 | 74 | 310 | 177 | TLTM | 174 | 174 |
| 119 | 19 | 28 | 26 | 29 | 29 | 20 | 74 | 311 | 177 | TLTM | 173 | 174 |
| 120 | 19 | 28 | 26 | 29 | 29 | 20 | 73 | 311 | 177 | TLTM | 174 | 174 |

| Example | Actual Barrel Temperatures (° C.) | Mw/Mn | Residual MS (ppm)[1] | BPA OH (ppm)[1] | HQ OH (ppm)[1] | Salicyl OH (ppm)[1] | % Endcap |
|---|---|---|---|---|---|---|---|
| 118 | 244/280x8 | 35511, 15855 | 423 | 48 | 13 | 13 | 97 |
| 119 | 244/280x7/281 | 37028, 16257 | 454 | 55 | 17 | 13 | 96 |
| 120 | 244/280x7/281 | 37684, 16480 | 451 | 73 | 20 | 24 | 94 |

[1] Determined by $^{31}$P-NMR

The product copolycarbonate of Example 118 was further characterized by proton and $^{13}$C-NMR and shown thereby to comprise about 0.8 mole percent

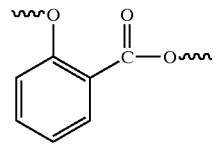

XII (relative to BPA derived repeat units) repeat units having structure XII wherein methyl salicylate has been fully incorporated into the backbone of the polycarbonate chain. In addition, these NMR studies revealed the presence of methyl carbonate terminal groups XIII

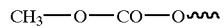

XIII in the product copolycarbonate of Example 118 in an amount corresponding to about 0.93 mole percent relative to BPA derived repeat units (i.e. 0.93 mmole of structural unit XIII per 100 moles of BPA derived repeat units). Finally, these NMR studies on the product copolycarbonate of Example 118 revealed presence of methyl ether terminal groups having structure XIV in an amount corresponding to about 0.39 moles per 100 moles

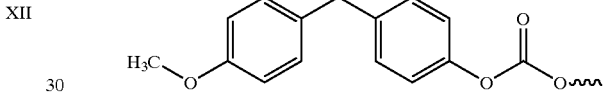

XIV of bisphenol A derived repeat units (i.e. 0.39 mole percent relative to all BPA derived repeat units present in the product copolycarbonate)

Examples 119–121 were carried out on an extruder configured as in Examples 103–105 and illustrate the use of the method of the present invention to prepare polycarbonate terpolymers comprising structural units derived from hydroquinone, methylhydroquinone and BPA. The starting monomers; BPA, hydroquinone (HQ), methylhydroquinone (MeHQ), and BMSC were charged to the reactor together with the transesterification catalyst tetramethylammonium hydroxide (TMAH, $2.5 \times 10^{-4}$ mole per mole BPA, HQ and MeHQ combined) and sodium hydroxide (NaOH, $1 \times 10^{-6}$ moles NaOH per mole BPA, HQ and MeHQ combined). The mixture was heated to about 195° C. and stirred under a nitrogen atmosphere for about 1 hour to produce a solution of an oligomeric polycarbonate comprising BPA structural units, HQ structural units, MeHQ structural units, and methyl salicyl endgroups having structure II. The mixture of bisphenols employed comprised about 40 mole percent BPA, 40 mole percent HQ and 20 mole percent MeHQ. The ratio of moles BMSC to the moles of BPA, HQ and MeHQ combined was about 1.015 (i.e. moles BMSC/(moles BPA+moles HQ+moles MeHQ)=1.015). The transparent, lightly colored polycarbonate emerging from the die face was pelletized and characterized. Molecular weights were determined by gel permeation chromatography.

TABLE 22

POLYCARBONATE TERPOLYMERS COMPRISING 40% BPA, 40%
HQ, AND 20% MeHQ: BMSC/(BPA + HQ + MeHQ) = 1.015, Cat. = TMAH-NaOH

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 119 | 22 | 28 | 28 | 29 | 29 | 20 | 27 | 290 | 181 | 22 | 195 | 198 |
| 120 | 18 | 25 | 27 | 29 | 29 | 20 | 18 | 288 | 270 | 13 | 195 | 194 |
| 121 | 25 | 28 | 28 | 29 | 29 | 18 | 16 | 285 | 213 | 10 | 192 | 198 |

| Example | Actual Barrel Temperatures (° C.) | Mw/Mn/PDI | Residual MS (ppm)[1] |
|---|---|---|---|
| 119 | 249/279/280x4/292/280x2 | 21054/8675/2.427 | 996 |
| 120 | 248/280x3/279/280/279x2/280 | 17495/7187/2.434 | 804 |
| 121 | 252/280x5/279/280x2 | 15809/6405/2.468 | 771 |

[1]Determined by GPC

Examples 122–124 were carried out on an extruder configured as in Examples 103–105 and illustrate the use of the method of the present invention to prepare polycarbonate terpolymers comprising structural units derived from biphenol, methylhydroquinone and BPA. The starting monomers; biphenol (BP), methylhydroquinone (MeHQ), bisphenol A (BPA), and BMSC were charged to the reactor together with the transesterification catalyst tetramethylammonium hydroxide (TMAH, $2.5 \times 10^{-4}$ mole per mole BP, MeHQ and BPA combined) and sodium hydroxide (NaOH, $2.0 \times 10^{-6}$ moles NaOH per mole BP, MeHQ and BPA combined). The mixture was heated to about 170° C. and stirred under a nitrogen atmosphere for about 1 hour to produce a solution of an oligomeric polycarbonate comprising BP structural units, MeHQ structural units, BPA structural units, and methyl salicyl endgroups having structure II. The oligomeric polycarbonate fed to the extruder was characterized by GPC ($M_w$=5584, and $M_n$=2115). The mixture of bisphenols employed comprised about 33 mole percent BP, about 33 mole percent MeHQ, and about 33 mole percent BPA. The ratio of moles BMSC to the moles of BP, MeHQ and BPA combined was about 1.028 (i.e. moles BMSC/(moles BP+moles MeHQ+moles BPA)=1.028). The solution introduced into the extruder was about 59 percent by weight methyl salicylate. The transparent, lightly colored polycarbonate emerging from the die face was pelletized and characterized. Molecular weights were determined by gel permeation chromatography.

TABLE 23

POLYCARBONATE TERPOLYMERS COMPRISING 33% BP, 33%
MeHQ, AND 33% BPA; BMSC/(BP + MeHQ + BPA) = 1.028; Cat. = TMAH-NaOH

| Example | Vacuum @ Vents (in. Hg.) | | | | | Solution Mass Flow Rate (lb/hr) | Torque (%) | Melt (° C.) | Screw speed (rpm) | Die P (psi)[1] | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 122 | 17 | 28 | 25 | 29 | 29 | 20 | 57 | 300 | 145 | TLTM | 173 | 174 |
| 123 | 22 | 28 | 25 | 29 | 29 | 20 | 61 | 301 | 145 | TLTM | 172 | 174 |
| 124 | 22 | 28 | 25 | 29 | 29 | 20 | 54 | 301 | 145 | TLTM | 172 | 174 |

| Example | Actual Barrel Temperatures (° C.) | Mw/Mn/PDI | Residual MS (ppm)[2] |
|---|---|---|---|
| 122 | 252/280/272/280x3/279/280/290 | 29202/13381/2.182 | 605.1 |
| 123 | 251/280/273/280x5/290 | 29555/13410/2.204 | 657 |
| 124 | 250/280/272/280x5/290 | 30183/13445/2.245 | 726 |

[1]"TLTM" indicates die pressure was "too low to measure",
[2]Determined by GPC

Examples 125–127 were carried out on an extruder configured as in Examples 103–105 and illustrate the use of the method of the present invention to prepare polycarbonate terpolymers comprising structural units derived from resorcinol, hydroquinone and BPA. The starting monomers, resorcinol (RS), hydroquinone (HQ), bisphenol A (BPA), and BMSC were charged to the reactor together with the transesterification catalyst tetramethylammonium hydroxide. (TMAH, $2.5 \times 10^{-4}$ mole per mole RS, HQ and BPA combined) and sodium hydroxide (NaOH, $2.0 \times 10^{-6}$ moles NaOH per mole RS, HQ and BPA combined). The mixture was heated to about 165° C. and stirred under a nitrogen atmosphere for about 1 hour to produce a solution of an oligomeric polycarbonate comprising RS structural units, HQ structural units, BPA structural units, and methyl salicyl endgroups having structure II. The oligomeric polycarbonate was characterized by GPC ($M_w$=1778, and $M_n$=645). The mixture of bisphenols employed comprised about 33 mole percent RS, about 33 mole percent HQ, and about 33 mole percent BPA. The ratio of moles BMSC to the moles of RS, HQ and BPA combined was about 1.02 (i.e. moles BMSC/(moles RS+moles HQ+BPA)=1.02). The solution introduced into the extruder was about 61 percent by weight methyl salicylate. The transparent, slightly orange copolycarbonate emerging from the die face was pelletized and characterized. Molecular weights were determined by gel permeation chromatography.

TABLE 24

POLYCARBONATE TERPOLYMERS COMPRISING 33% RS, 33% HQ, AND 33% BPA; BMSC/(RS + HQ + BPA) = 1.02; Cat. = TMAH-NaOH

| Example | Vacuum @ Vents (in. Hg.) | | | | | Solution Mass Flow Rate (lb/hr) | Torque (%) | Melt (° C.) | Screw speed (rpm) | Die P (psi)[1] | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 125 | 21 | 29 | 29 | 29 | 29 | 20 | 39 | 298 | 175 | TLTM | 168 | 171 |
| 126 | 22 | 29 | 29 | 29 | 29 | 20 | 44 | 298 | 175 | TLTM | 168 | 173 |
| 127 | 22 | 29 | 29 | 29 | 29 | 20 | 40 | 299 | 175 | TLTM | 163 | 175 |

| Example | Actual Barrel Temperatures (° C.) | Mw/Mn/PDI | Residual MS (ppm)[2] |
|---|---|---|---|
| 125 | 246/277/267/280x3/284/281/280 | 30160/13521/2.231 | 417 |
| 126 | 241/280/268/280x6 | 27410/12202/2.246 | 319 |
| 127 | 241/280/268/280x5/279 | 29787/13423/2.219 | 1164 |

[1]"TLTM" indicates die pressure was "too low to measure".
[2]Determined by GPC

Examples 128–130 were carried out on an extruder configured as in Examples 103–105 and illustrate the use of the method of the present invention to prepare branched copolycarbonates comprising structural units derived from biphenol, and BPA. The starting monomers, bisphenol (BP), bisphenol A (BPA), BMSC and branching agent 1,1,1,-tris(4-hydroxyphenol)ethane (THPE) were charged to the reactor together with the transesterification catalyst tetramethylammonium hydroxide (TMAH, $2.5 \times 10^{-4}$ mole per mole BP and BPA combined) and sodium hydroxide (NaOH, $2.0 \times 10^{-6}$ moles NaOH per mole BP and BPA combined). The mixture was heated to about 180° C. and stirred under a nitrogen atmosphere for about 1 hour to produce a solution of a branched oligomeric polycarbonate comprising BP structural units, BPA structural units, THPE structural units, and methyl salicyl endgroups having structure II. The mixture of bisphenols employed comprised about 40 mole percent BP, and about 60 mole percent BPA. The ratio of THPE to total bisphenols was about 0.0025 (i.e. mole THPE/(moles BP+moles BPA)=0.0025). The ratio of moles BMSC to the moles of BP and BPA combined was about 1.03 (i.e. moles BMSC/(moles BP+moles BPA)=1.03). During the experiment the pressure on the upstream side of the pressure control valve was about 20 psi. The transparent, slightly colored, branched copolycarbonate emerging from the die face was pelletized and characterized. Molecular weights were determined by gel permeation chromatography.

TABLE 25

BRANCHED BISPHENOL A-BIPHENOL COPOLYCARBONATES
BMSC/(BPA + BP) = 1.03; Catalyst = TMAH-NaOH, 60% BPA, 40% BP

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
|---|---|---|---|---|---|---|---|---|---|---|---|---|
| | $V_1$ | $V_3$ | $V_4$ | $V_5$ | $V_6$ | | | | | | | |
| 128 | 19 | 28 | 28 | 29 | 29 | 20 | 49 | 304 | 200 | TLTM | 180 | 185 |
| 129 | 19 | 28 | 28 | 29 | 29 | 20 | 47 | 301 | 176 | TLTM | 179 | 186 |
| 130 | 20 | 28 | 28 | 29 | 29 | 20 | 47 | 302 | 176 | TLTM | 176 | 186 |

| Example | Actual Barrel Temperatures (° C.) | Mw/Mn | Residual MS (ppm)[1] | BP/MS OH (ppm)[2] | BPA OH (ppm)[2] | Salicyl OH (ppm)[2] | % Endcap |
|---|---|---|---|---|---|---|---|
| 128 | 253/280x6/281/290 | 23636/10760 | 562 | 70 | 15 | 3 | 99 |
| 129 | 251/280x5/279/280/290 | 23551/10674 | 646 | 83 | 19 | 3 | 99 |
| 130 | 251/280x7/290 | 23588/10533 | 693 | 92 | 21 | 3 | 99 |

[1]Determined by GPC
[2]Determined by $^{31}$P-NMR

The polycarbonate samples of Examples 128–130 were characterized by $^{31}$P-NMR following derivatization with 2-chloro-1,3,2-dioxaphospholane. The column headings "BP/MS OH (ppm)" refers to the combined amount in parts per million of OH groups attributable to residual methyl salicylate solvent together with OH groups attributable to pelletized and characterized. Molecular weights were determined by gel permeation chromatography.

TABLE 26

BPA POLYCARBONATES COMPRISING FUMED SILICA:
BMSC/(BPA) = 1.019, Catalyst = TBPA and NaOH, 5% FUMED SILICA

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
|---|---|---|---|---|---|---|---|---|---|---|---|---|
|  | $V_1$ | $V_3$ | $V_4$ | $V_5$ | $V_6$ |  |  |  |  |  |  |  |
| 131 | 25 | 28 | 28 | 29 | 29 | 22 | 43 | 305 | 250 | TLTM | 192 | 198 |
| 132 | 23 | 28 | 28 | 29 | 29 | 22 | 41 | 306 | 250 | 14 | 193 | 198 |
| 133 | 23 | 28 | 28 | 29 | 29 | 22 | 41 | 305 | 250 | 21 | 192 | 198 |
| 134 | 23 | 28 | 28 | 29 | 29 | 22 | 39 | 304 | 250 | 23 | 194 | 198 |
| 135 | 22 | 28 | 28 | 29 | 29 | 22 | 37 | 304 | 250 | 31 | 193 | 189 |

| Example | Actual Barrel Temperatures (° C.) | Mw/Mn | Residual MS (ppm)[1,2] | BPA OH (ppm)[2] | Salicyl OH (ppm)[2] | % Endcap |
|---|---|---|---|---|---|---|
| 131 | 264/280/281/280/281/280/281x3 | 25340/11005 | 1309[2] | 322 | 130 | 85 |
| 132 | 261/279/280x7 | 25967/11013 | 1503[2] | 352 | 171 | 83 |
| 133 | 261/280x8 | 25678/10749 | 3169[1] | — | — | — |
| 134 | 260/280x8 | 24402/9806 | 1409[2] | 438 | 252 | 80 |
| 135 | 261/280x8 | 24256/10107 | 1914[1] | — | — | — |

[1]Determined by GPC
[2]Determined by $^{31}$P-NMR biphenol OH polymer endgroups. The concentration of hydroxy groups present in the product copolycarbonate is expressed in parts "OH" group per million parts of copolycarbonate. Because the $^{31}$P signal for 1,3,2-dioxaphospholane-derivatized free methyl salicylate (MS) overlapped with the signal for the 1,3,2-dioxaphospholane derivatized biphenol endgroups the concentration of "free methyl salicylate OH" and "biphenol endgroup OH" is given as the sum of the two concentrations. The concentration of methyl salicylate itself, as opposed to the concentration of methyl salicylate OH groups, was determined independently by GPC. Similarly, the column headings "Salicyl OH (ppm)" and "BPA OH (ppm)" refer to the concentration of OH groups attributable to salicyl OH groups (See structure XI) and OH groups attached to bisphenol A endgroups expressed in parts "OH group" (Formula weight=17) per million parts product copolycarbonate.

Examples 131–135 were carried out on an extruder configured as in Examples 103–105 and illustrate the use of the method of the present invention to prepare bisphenol A polycarbonate comprising an inorganic filler, fumed silica. The starting monomers, bisphenol A (BPA), and BMSC, and treated fumed silica were charged to the reactor together with the transesterification catalyst, tetrabutyl-phosphonium acetate (TBPA, $1.5\times10^{-4}$ mole per mole BPA) and sodium hydroxide (NaOH, $2.0\times10^{-6}$ moles NaOH per mole BPA). The fumed silica was added in an amount calculated to produce a product polycarbonate comprising 5 percent by weight fumed silica. The mixture was heated to about 190–195° C. and stirred under a nitrogen atmosphere for about 1 hour to produce a solution of a oligomeric BPA polycarbonate comprising BPA structural units and methyl salicyl endgroups having structure II, in which was suspended the fumed silica. The ratio of moles BMSC to the moles of BPA was about 1.019. During the experiment comprising Examples 131–135 the pressure on the upstream side of the pressure control valve was about 20 to 50 psi. The opaque white polycarbonate emerging from the die face was The product polycarbonates of Examples 131, 132 and 134 were further characterized by $^{31}$P-NMR following derivatization with 2-chloro-1,3,2-dioxaphospholane. Typically, analysis using $^{31}$P-NMR provides a lower value of residual methyl salicylate, "Residual MS (ppm)" than does analysis by GPC. The $^{31}$P-NMR value is typically considered to be more accurate than the value obtained using GPC. The product polycarbonates of Examples 131, 132 and 134 were further analyzed by proton and $^{13}$C-NMR. The product polycarbonate of Example 132 was shown thereby to comprise about 1.5 mole percent (relative to BPA derived repeat units) repeat units having structure XII wherein methyl salicylate has been fully incorporated into the backbone of the polycarbonate chain. The product polycarbonates of Examples 131, 132, and 134 were also shown by these NMR studies to comprise methyl carbonate terminal groups XIII in amounts corresponding to between about 0.80 and 0.85 mole percent relative to BPA derived repeat units (i.e. from about 0.80 to about 0.85 mole of structural unit XIII per 100 moles of BPA derived repeat units). Finally, these NMR studies on the product polycarbonates of Examples 131, 132 and 134 revealed the presence of methyl ether terminal groups having structure XIV in amounts corresponding to from about 0.30 to about 0.50 moles structure XIV per 100 moles of bisphenol A derived repeat units (i.e. about 0.30–0.50 mole percent relative to all BPA derived repeat units present in the product polycarbonate. Additional polymerizations were carried out in a manner identical to that employed in Examples 131–135 with the exception that less (2 percent fumed silica in the product polycarbonate) or more (10 percent fumed silica in the product polycarbonate) fumed silica was employed. The results were substantially the same as those observed for Examples 131–135.

Examples 136–143 were carried out on an extruder configured as in Examples 103–105 and illustrate the effect of feed temperature and prolonged heating on the quality of the product polycarbonate prepared using the method of the present invention. The starting monomers; bisphenol A (BPA) and BMSC were charged to the reactor together with the transesterification catalyst, tetrabutylphosphonium acetate (TBPA, $2.5 \times 10^{-4}$ mole per mole BPA) and sodium hydroxide (NaOH, $1.0 \times 10^{-6}$ moles NaOH per mole BPA). The mixture was heated in a range between about 180–220° C. over the course of the experiment comprised by Examples 136–143. It should be noted that the solution of oligomeric polycarbonate being transformed into the product polycarbonates of Examples 136–143 was heated for progressively longer periods of time at progressively higher temperatures over the course of the experiment. Thus, the product polycarbonate of Example 136 was exposed to much milder conditions (lower temperature and shorter heating time) than those conditions to which the product polycarbonate of Example 143 (higher temperature and longer heating time) was subjected. The solution of the oligomeric BPA polycarbonate comprising BPA structural units and methyl salicyl endgroups having structure II was stirred under a nitrogen atmosphere over the course of the experiment. The ratio of moles BMSC to the moles of BPA was about 1.02. The solution introduced into the extruder was about 55 by weight methylisalicylate. During the experiment comprising Examples 136–143 the pressure on the upstream side of the pressure control valve was about 46 psi. The polycarbonate emerging from the die face was pelletized and characterized. Molecular weights were determined by gel permeation chromatography.

"% Endcap". In addition, the product polycarbonate of Example 143 was shown by $^1$H-NMR and $^{13}$C-NMR to comprise elevated levels of methyl carbonate terminal groups XIII (about 1.7 moles of structural unit XIII per 100 moles of BPA derived repeat units), methyl ether terminal groups having structure XIV (about 3.3 moles of structural unit XIV per 100 moles of BPA derived repeat units), and "internal" salicyl groups (repeat units having structure XII wherein methyl salicylate has been fully incorporated into the backbone of the polycarbonate chain). The "internal" salicyl groups were found to be present in an amount corresponding to about 3.9 moles of repeat units XII per 100 moles of BPA derived repeat units. These data and the data presented in Table 27 indicate that structural features of the product polycarbonate prepared by the method of the present invention may be controlled by varying the temperature at which the equilibration reaction is carried out and the length of time the solution of oligomeric polycarbonate is heated prior to its introduction into the devolatilizing extruder. It is believed that additional control of product polycarbonate structural features may be exerted by judicious selection of the transesterification catalyst employed.

Examples 144–153 were carried out on an extruder configured as in Examples 103–105 and illustrate the effect of concentrating the feed solution of oligomeric polycarbonate prior to extrusion, and the effect of extruder throughput rate on the quality of the product polycarbonate prepared using the method of the present invention. The starting monomers;

TABLE 27

EFFECT OF HEATING TIME AND TEMPERATURE ON PRODUCT
BPA POLYCARBONATES BMSC/(BPA) = 1.02, Catalyst = TBPA and NaOH

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P. Valve (° C.) |
| --- | --- | --- | --- | --- | --- | --- | --- | --- | --- | --- | --- | --- |
| | $V_1$ | $V_3$ | $V_4$ | $V_5$ | $V_6$ | | | | | | | |
| 136 | 20 | 28 | 28 | 29 | 29 | 25 | 63 | 303 | 150 | 521 | 179 | 184 |
| 137 | 20 | 28 | 28 | 29 | 29 | 25 | 63 | 303 | 150 | 561 | 179 | 183 |
| 138 | 20 | 28 | 28 | 29 | 29 | 25 | 67 | 306 | 150 | 701 | 191 | 200 |
| 139 | 20 | 28 | 28 | 29 | 29 | 25 | 65 | 305 | 150 | 651 | 196 | 218 |
| 140 | 20 | 28 | 28 | 29 | 29 | 25 | 64 | 306 | 150 | 663 | 205 | 242 |
| 141 | 20 | 28 | 28 | 29 | 29 | 25 | 57 | 304 | 150 | 631 | 210 | 255 |
| 142 | 20 | 28 | 28 | 29 | 29 | 25 | 41 | 300 | 150 | 393 | 214 | 255 |
| 143 | 20 | 28 | 28 | 29 | 29 | 25 | 29 | 293 | 150 | 263 | 219 | 259 |

| Example | Actual Barrel Temperatures (° C.) | Mw/Mn | Residual MS (ppm)[1] | BPA OH (ppm)[2] | Salicyl OH (ppm)[2] | % Endcap |
| --- | --- | --- | --- | --- | --- | --- |
| 136 | 256/280x8 | 30065/14043 | 1049 | 76 | 19 | 96 |
| 137 | 256/280x5/279/280x2 | 30337/14010 | 1213 | — | — | — |
| 138 | 261/281/280x7 | 32273/14278 | 1297 | — | — | — |
| 139 | 261/280x8 | 35780/14787 | 1020 | 90 | 35 | 95 |
| 140 | 263/281/280x7 | 31389/14312 | 1015 | — | — | — |
| 141 | 265/281/280x7 | 30720/14112 | 999 | — | — | — |
| 142 | 268/281/280x4/278/279/280 | 29396/15083 | — | 150 | 192 | 85 |
| 143 | 269/281/280x2/279/280/277/279/280 | 23164/10580 | 1146 | 266 | 435 | 78 |

[1]Determined by GPC
[2]Determined by $^{31}$P-NMR

The product polycarbonates were found to have suffered molecular weight loss under conditions of higher temperature and longer heating time (See Examples 142 and 143). Moreover, $^{31}$P-NMR following derivatization with 2-chloro-1,3,2-dioxaphospholane revealed that the prolonged heating at the higher temperatures of Examples 142 and 143 resulted in product polycarbonates having a higher number of BPA and salicyl hydroxyl endgroups and a correspondingly lower bisphenol A (BPA) and BMSC were charged to the reactor together with the transesterification catalyst, tetrabutylphosphonium acetate (TBPA, $2.5 \times 10^{-4}$ mole per mole BPA) and sodium hydroxide (NaOH, $1.0 \times 10^{-6}$ moles NaOH per mole BPA). The mixture was heated initially to about 190–195° C. to produce a solution of oligomeric polycarbonate comprising about 55 percent by weight methyl salicylate. This was fed to the extruder to establish a baseline performance (See Examples 144 and 145) after which, extrusion was interrupted and a portion of the methyl salicylate was distilled under reduced pressure from the reactor until the concentration of methyl salicylate in the solution was reduced to lower product polycarbonate molecular weights and lower percent endcap ("% EC"). The entire experiment comprising Examples 144–153 was carried out over the course of about six hours.

TABLE 28

EFFECT OF FEED CONCENTRATION AND THROUGHPUT RATE
ON PRODUCT BPA POLYCARBONATES: BMSC/(BPA) = 1.02, Catalyst = TBPA AND NaOH

| Example | Vacuum @ Vents (in. Hg.) | | | | | Solution Mass Flow Rate (lb/hr) | Torque (%) | Melt (° C.) | Screw speed (rpm) | Die P (psi) | T feed in Reactor (° C.) | T feed before P-Valve (° C.) |
|---|---|---|---|---|---|---|---|---|---|---|---|---|
| | $V_1$ | $V_3$ | $V_4$ | $V_5$ | $V_6$ | | | | | | | |
| 144 | 12 | 25 | 28 | 29 | 29 | 45 | 52 | 331 | 350 | 557 | 193 | 204 |
| 145 | 12 | 25 | 28 | 29 | 29 | 30 | 54 | 316 | 235 | 562 | 197 | 215 |
| 146 | 20 | 28 | 28 | 29 | 29 | 23 | 59 | 320 | 236 | 477 | 218 | 214 |
| 147 | 20 | 28 | 28 | 29 | 29 | 34.6 | 50 | 326 | 351 | 393 | 220 | 214 |
| 148 | 23 | 28 | 28 | 29 | 29 | 18.8 | 46 | 311 | 233 | 367 | 215 | 214 |
| 149 | 21 | 28 | 28 | 29 | 29 | 28.1 | 43 | 318 | 350 | 353 | 216 | 216 |
| 150 | 21 | 28 | 28 | 29 | 29 | 35 | 39 | 323 | 451 | 311 | 218 | 216 |
| 151 | 20 | 28 | 28 | 29 | 29 | 42 | 35 | 324 | 550 | 279 | 218 | 216 |
| 152 | 20 | 28 | 28 | 29 | 29 | 50 | 33 | 329 | 675 | 244 | 216 | 217 |
| 153 | 20 | 28 | 28 | 29 | 29 | 60 | 30 | 334 | 800 | 214 | 215 | 217 |

| Example | Weight % of MS in feed solution | Actual Barrel Temperatures (° C.) | Mw/Mn | Residual MS (ppm)[1] | BPA OH (ppm)[1] | Salicyl OH (ppm)[1] | % EC |
|---|---|---|---|---|---|---|---|
| 144 | 55 | 252/278x2/280x3/286/282/280 | 29276/12666 | 1333 | 136 | 38 | 94 |
| 145 | 55 | 256/282/280x4/278x2/280 | 30833/13256 | 1379 | 151 | 44 | 92 |
| 146 | 35 | 272/278/280x2/281/280/288/284/282 | 31373/13398 | 1260 | 205 | 113 | 87 |
| 147 | 35 | 266/279/280x4/282/280/279 | 28495/12172 | 1493 | 289 | 170 | 84 |
| 148 | 22 | 276/278/280x2/281/280/288/284/282 | 26929/11515 | 1419 | 316 | 240 | 81 |
| 149 | 22 | 273/279/280x4/285/281/280 | 24844/10682 | 1851 | 367 | 264 | 80 |
| 150 | 22 | 272/279/280x4/283/281/280 | 23079/9926 | 2136 | 411 | 307 | 79 |
| 151 | 22 | 270/280x7/279 | 22021/9480 | 2597 | 484 | 341 | 77 |
| 152 | 22 | 269/279/280x5/281/280 | 21060/9068 | 2937 | 537 | 372 | 76 |
| 153 | 22 | 267/279/280x4/281x2/280 | 19614/8420 | 3433 | 601 | 411 | 75 |

[1]Determined by $^{31}$P-NMR about 35 percent by weight. Extrusion was then recommended and the polycarbonates of Examples 146 and 147 were collected at the extruder die face. Extrusion was again discontinued and additional methyl salicylate was distilled from the reactor under reduced pressure. The resultant solution of oligomeric polycarbonate comprising methyl salicyl endgroups II had the following characteristics.

| | Weight % of MS in feed solution | $M_w$ | $M_n$ | BPA OH (ppm)[1] | Salicyl OH (ppm)[1] | % EC |
|---|---|---|---|---|---|---|
| Feed in Examples 148–153 | 22.3 | 5941 | 2393 | 2546 | 929 | 76 |

[1]Determined by $^{31}$P-NMR

The effect of extruder throughput rate was determined by gradually increasing the rate at which the solution of the oligomeric polycarbonate was presented to the extruder over the course of Examples 144–153. In each of Examples 144–153 the polycarbonate emerging from the die face was pelletized and characterized. Molecular weights were determined by gel permeation chromatography. As the throughput rate was increased the amount of residual methyl salicylate in the product polycarbonate was observed to increase. Moreover, higher throughput rates resulted in Examples 154–163 were carried out on an extruder configured as in Examples 103–105 and illustrate the stable operation of the method of the present invention using a concentrated feed solution of the oligomeric polycarbonate in methyl salicylate. Moreover, Examples 154–163 illustrate the effect of feed temperature and throughput rate on the molecular weight of the product polycarbonate. The starting monomers, bisphenol A (BPA) and BMSC were charged to the reactor together with the transesterification catalyst, tetramethyl-ammonium hydroxide (TMAH, $1.0 \times 10^{-4}$ mole per mole BPA) and sodium hydroxide (NaOH, $2.0 \times 10^{-6}$ moles NaOH per mole BPA). The mixture was heated initially to about 175–180° C. to produce a solution of oligomeric polycarbonate comprising about 55 percent by weight methyl salicylate. The solution was then fed to the extruder to establish a baseline performance (See Example 154) after which, extrusion was interrupted and a portion of the methyl salicylate was distilled under reduced pressure from the reactor until the concentration of methyl salicylate in the solution was reduced to about 35 percent by weight. The resultant solution of oligomeric polycarbonate comprising methyl salicyl endgroups II was sampled twice during the Experiment constituted by Examples 155 through 163 and the results compared with the solution immediately after its preparation and prior to the removal of any methyl salicylate formed during the equilibration of the starting monomers (See "Feed in Example 154"). As can be seen the molecular weight of the oligomeric polycarbonate remains reasonably stable over the course of the experiment (Compare "Feed in Example 155" with "Feed in Example 163").

| Example | Weight % of MS in feed solution | $M_w$ | $M_n$ |
|---|---|---|---|
| Feed in Example 154 | 56 | 5483 | 2566 |
| Feed in Example 155 | 37.2 | 5839 | 2722 |
| Feed in Example 163 | 35.5 | 5789 | 2658 |

Following concentration of the feed solution, extrusion was recommenced and the polycarbonates of Examples 155 to 163 were collected at the extruder die face. In each of Examples 154–163 the polycarbonate emerging from the die face was pelletized and characterized. Molecular weights were determined by gel permeation chromatography. The data in Table 29 illustrate that stable production of high quality polycarbonate may be achieved using a concentrated feed solution and illustrate the beneficial effects of lower reactor temperature. The extruder used according to the method of the present invention serves two roles; (1) the extruder effects solvent removal, and (2) the extruder functions as a polymerization reactor for the conversion of the oligomeric polycarbonate starting material into high molecular weight polycarbonate. Concentrating the solution fed to the extruder is seen as beneficial in that it allows greater leeway in apportioning these two functions.

TABLE 29

EFFECT OF CONCENTRATING THE SOLUTION OF OLIGOMERIC POLYCARBONATE
ON PRODUCT BPA POLYCARBONATES: BMSC/(BPA) = 1.025, Catalyst = TMAH AND NaOH

| Example | Vacuum @ Vents (in. Hg.) $V_1$ | $V_3$ | $V_4$ | $V_5$ | $V_6$ | Solution Mass Flow Rate (lb/hr) | Torque (%) | Melt (° C.) | Screw speed (rpm) | Die P (psi) | T feed in Reactor (° C.) | T feed before P-Valve (° C.) |
|---|---|---|---|---|---|---|---|---|---|---|---|---|
| 154 | 20 | 28 | 26 | 29 | 29 | 20 | 56 | 301 | 200 | TLTM | 176 | 175 |
| 155 | 17 | 28 | 26 | 29 | 29 | 15 | 67 | 309 | 218 | TLTM | 179 | 212 |
| 156 | 17 | 28 | 26 | 29 | 29 | 20 | 60 | 308 | 218 | TLTM | 176 | 208 |
| 157 | 17 | 28 | 26 | 29 | 29 | 25 | 62 | 324 | 357 | TLTM | 175 | 206 |
| 158 | 20 | 28 | 26 | 29 | 29 | 30 | 58 | 322 | 357 | TLTM | 174 | 204 |
| 159 | 17 | 28 | 26 | 29 | 29 | 35 | 58 | 328 | 429 | TLTM | 174 | 203 |
| 160 | 16 | 28 | 26 | 29 | 29 | 40 | 56 | 340 | 554 | TLTM | 175 | 202 |
| 161 | 17 | 28 | 25 | 29 | 29 | 45 | 54 | 345 | 626 | TLTM | 176 | 201 |
| 162 | 17 | 28 | 25 | 29 | 29 | 45 | 53 | 351 | 700 | TLTM | 178 | 202 |
| 163 | 25 | 28 | 26 | 29 | 29 | 15 | 69 | 305 | 218 | TLTM | 178 | 211 |

| Example | Weight % of MS in feed solution | Actual Barrel Temperatures (° C.) | Mw/Mn | Residual MS (ppm)[1] |
|---|---|---|---|---|
| 154 | 56 | 250/278/273/280/281/280/285/282/281 | 27668/12470 | 491 |
| 155 | 37.2 | 268/279/281x2/282/280/287/281/280 | 30826/13653 | 465 |
| 156 | nd[2] | 265/277/279x2/281/280/285/281/280 | 29905/13342 | 672 |
| 157 | nd[2] | 262/278/280x2/282/280/287/284/280 | 29434/13090 | 567 |
| 158 | nd[2] | 259/278/279/280x3/284/282/280 | 28690/12756 | 688 |
| 159 | nd[2] | 257/278/279x2/281/280/283/282/280 | 28214/12481 | 1071 |
| 160 | nd[2] | 255/278/280/279/281/280/284/285/280 | 28831/12815 | 639 |
| 161 | nd[2] | 253/279/280x4/283/284/280 | 28308/12609 | 1410 |
| 162 | nd[2] | 252/280/281/280x3/283x2/280 | 28540/12604 | 803 |
| 163 | 35.5 | 257/283/281x2/279/280/272/271/279 | 31133/13788 | 345 |

[1]Determined by $^{31}$P-NMR
[2]Value was not determined but was believed to correspond to between about 37.2 and 35.5 weight percent methyl salicylate.

| Example | BPA OH (ppm)[1] | Salicyl OH (ppm)[1] | % EC | Salicyl OH[2] | MS[2] | Structure XIII[2] | Structure XIV[2] | Structure XII[2] |
|---|---|---|---|---|---|---|---|---|
| 154 | 27 | 12 | 99 | 0.018 | 0.11 | 0.21 | 0.04 | |
| 155 | 29 | 5 | 99 | 0.007 | 0.15 | 0.31 | 0.09 | |
| 156 | 42 | 13 | 98 | 0.020 | 0.15 | 0.32 | 0.09 | |
| 157 | 40 | 13 | 98 | 0.019 | 0.16 | 0.28 | 0.09 | 0.5 |
| 158 | 60 | 19 | 97 | 0.029 | 0.20 | 0.27 | 0.09 | |
| 159 | 72 | 20 | 97 | 0.030 | 0.21 | 0.30 | 0.10 | 0.8 |
| 160 | 64 | 19 | 97 | 0.028 | 0.22 | 0.35 | 0.11 | |
| 161 | 75 | 21 | 96 | 0.031 | 0.23 | 0.37 | 0.10 | 0.6 |
| 162 | 61 | 15 | 97 | 0.022 | 0.21 | 0.38 | 0.13 | |
| 163 | 29 | 11 | 98 | 0.016 | 0.11 | 0.42 | 0.17 | 1.0 |

[1]Determined by $^{31}$P-NMR,
[2]Expressed in moles per 100 moles of BPA-containing structural units It is noteworthy that over time, the concentration of by-product structures XII, XIII and XIV increases in the product polycarbonate. This is strong evidence for the proposition that prolonged heating at higher temperatures is the responsible for the appearance of these by-product structures.

Examples 164–181 were carried out on an extruder configured as in Examples 103–105 and illustrate both the consistency of stable operation of the process of the present invention as well as the potential for using extruder torque and extruder melt temperature as key process control criteria when using the method of the present invention. The starting monomers, bisphenol A (BPA) and BMSC were charged to the reactor together with the transesterification catalyst, tetramethyl-ammonium hydroxide (TMAH, $2.5 \times 10^{-4}$ mole per mole BPA). No sodium hydroxide was employed. The mixture was heated initially to about 160–165° C. to produce a solution of oligomeric polycarbonate comprising about 55 percent by weight methyl salicylate. In Examples 164–170, the molar ratio of BMSC to BPA was varied from about 1.018 to about 1.03, by addition of BMSC monomer to the equilibrated mixture of oligomers in the reactor. The molecular weights of the product polycarbonates varied accordingly. In Examples 170 to 181 the molar ratio of BMSC to BPA was held constant at 1.03. The process was run for about an hour at the BMSC to BPA molar ratio of 1.03 in order to study short-term consistency of the process. The product emerging from the extruder die face was sampled every five minutes giving a total of 12 product polycarbonate samples (Examples 170–181) which were analyzed by gel permeation chromatography. The data reveal the remarkable stability of the process of the present invention, the standard deviation of the weight average molecular weight, $M_w$, being less than 1 percent of the average value of $M_w$ for Examples 170–181. The standard deviation of the residual methyl salicylate value was somewhat higher and reflects the relatively high standard deviation associated with methyl salicylate quantitation by GPC. (The standard deviation in the measurement of a chloroform solution containing 1000 ppm of methyl salicylate was about 75 ppm or about 7.5% of the average value determined.). In Table 30 the symbol """ indicates that the value was not recorded but should not have been different significantly different from the value preceding it.

TABLE 30

PROCESS CONTROL USING MELT TEMPERATURE AND TORQUE AS KEY PROCESS CONTROL CRITERIA: CATALYST = TMAH

| Example | Vacuum @ Vents (in. Hg.) | | | | | Solution Mass Flow Rate (lb/hr) | Torque (%) | Melt (° C.) | Screw speed (rpm) | T feed in Reactor (° C.) | T feed before P-Valve (° C.) |
|---|---|---|---|---|---|---|---|---|---|---|---|
| | $V_1$ | $V_3$ | $V_4$ | $V_5$ | $V_6$ | | | | | | |
| 164 | 20 | 29 | 29 | 29 | 29 | 20 | 53 | 313 | 179 | 163 | 168 |
| 165 | 20 | 29 | 29 | 29 | 29 | 20 | 51 | 310 | 179 | 162 | 168 |
| 166 | 20 | 29 | 29 | 29 | 29 | 20 | 46 | 306 | 174 | 163 | 168 |
| 167 | 20 | 29 | 29 | 29 | 29 | 20 | 42 | 304 | 174 | 164 | 168 |
| 168 | 20 | 29 | 29 | 29 | 29 | 20 | 39 | 301 | 174 | 164 | 168 |
| 169 | 20 | 29 | 29 | 29 | 29 | 20 | 34 | 299 | 175 | 162 | 168 |
| 170 | 20 | 29 | 29 | 29 | 29 | 20 | 31 | 297 | 175 | 163 | 168 |
| 171 | " | " | " | " | " | " | " | " | " | " | " |
| 172 | " | " | " | " | " | " | " | " | " | " | " |
| 173 | " | " | " | " | " | " | " | " | " | " | " |
| 174 | " | " | " | " | " | " | " | " | " | " | " |
| 175 | " | " | " | " | " | " | " | " | " | " | " |
| 176 | " | " | " | " | " | " | " | " | " | " | " |
| 177 | " | " | " | " | " | " | " | " | " | " | " |
| 178 | " | " | " | " | " | " | " | " | " | " | " |
| 179 | 21 | 29 | 29 | 29 | 29 | 20 | 30 | 296 | 175 | 163 | 168 |
| 180 | " | " | " | " | " | " | " | " | " | " | " |
| 181 | " | " | " | " | " | " | " | " | " | " | " |

| Example | BMSC/BPA Ratio | Actual Barrel Temperatures (° C.) | Mw/Mn/PDI[2] | Residual MS (ppm)[1,3] |
|---|---|---|---|---|
| 164 | 1.018 | 235/283/275/281/281/280/296/283/281 | 35893/15144/2.370 | 1247 |
| 165 | 1.02 | 239/281x2/280x3/286/280x2 | 34685/14716/2.357 | 1360 |
| 166 | 1.022 | 242/280x8 | 32795/13974/2.347 | 1528 |
| 167 | 1.024 | 243/280x8 | 30469/13134/2.320 | 1595 |
| 168 | 1.026 | 244/280x5/271/280x2 | 28457/12386/2.298 | 1983 |
| 169 | 1.028 | 245/280x8 | 26980/11774/2.291 | 1515 |
| 170 | 1.03 | 246/280x5/281/280x2 | 25535/11184/2.283 | 1465 |
| 171 | 1.03 | " | 25234/11068/2.280 | 1523 |
| 172 | 1.03 | " | 25142/11052/2.275 | 1545 |
| 173 | 1.03 | " | 25111/11033/2.276 | 1687 |
| 174 | 1.03 | " | 24891/10916/2.280 | 1727 |
| 175 | 1.03 | " | 24922/10937/2.279 | 1825 |
| 176 | 1.03 | " | 25039/10988/2.279 | 1759 |
| 177 | 1.03 | " | 25254/11048/2.286 | 1488 |
| 178 | 1.03 | " | 25449/11148/2.283 | 1504 |
| 179 | 1.03 | 247/280x8 | 25479/11133/2.289 | 1557 |

TABLE 30-continued

PROCESS CONTROL USING MELT TEMPERATURE AND TORQUE
AS KEY PROCESS CONTROL CRITERIA: CATALYST = TMAH

| 180 | 1.03 | " | 25301/11061/2.287 | 1499 |
| 181 | 1.03 | " | 25184/11015/2.286 | 1796 |

[1]Determined by GPC,
[2]The standard deviation of the weight average molecular weight, $M_w$, was 208 daltons calculated for Examples 170–181.
[3]The standard deviation of the residual methyl salicylate present in the product polycarbonate wads 134 ppm calculated for Examples 170–181.

The data in Table 30 show that melt temperature and torque may be used as a part of a closed-loop control strategy to monitor and control the molecular weight of the product polycarbonate produced by the method of the present invention. In the experiment comprised by Examples 164–181 differences in molecular weight that are larger than about 1% can be considered statistically meaningful when this strategy is used to quantify differences in molecular weight produced by mixtures containing different molar ratios of carbonate/bisphenol. The standard deviation observed in these measurements can be considered remarkable considering that these measurements included not only the variability associated with the process itself but also contained the error associated with the evaluation of the molecular weight and residual methyl salicylate content of these samples.

The invention has been described in detail with particular reference to preferred embodiments thereof, but it will be understood by those skilled in the art that variations and modifications can be effected within the spirit and scope of the invention.

What is claimed is:

1. A method for the preparation of polycarbonate, said method comprising extruding in the presence of a transesterification catalyst at one or more temperatures in a temperature range between about 100° C. and about 400° C. a solution comprising a solvent and an oligomeric polycarbonate, said extruding being carried out on an extruder equipped with at least one vent adapted for solvent removal, said oligomeric polycarbonate comprising polycarbonate repeat units derived from at least one dihydroxy aromatic compound, said oligomeric polycarbonate comprising ester substituted phenoxy terminal groups having structure I

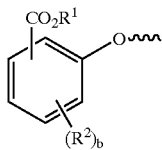

I wherein
  $R^1$ is a $C_1$–$C_{20}$ alkyl group, $C_4$–$C_{20}$ cycloalkyl group, or $C_4$–$C_{20}$ aryl group;
  $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

2. A method according to claim 1 wherein said ester substituted phenoxy terminal groups have structure II

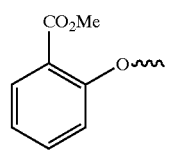

II

3. A method according to claim 1 wherein said polycarbonate repeat units derived from at least one dihydroxy aromatic compound comprise repeat units having structure III

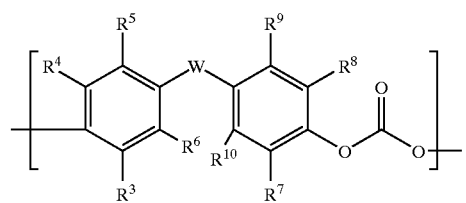

III wherein $R^3$–$R^{10}$ are independently a hydrogen atom, halogen atom, nitro group, cyano group, $C_1$–$C_{20}$ alkyl group, $C_4$–$C_{20}$ cycloalkyl group, or $C_6$–$C_{20}$ aryl group; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

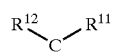

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

4. A method according to claim 1 wherein said polycarbonate repeat units derived from at least one dihydroxy aromatic compound comprise repeat units derived from bisphenol A, said bisphenol A derived repeat units having structure IV,

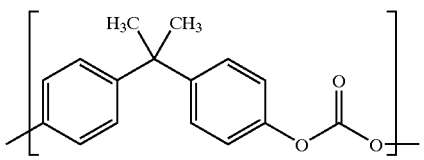

IV and optionally repeat units having structure V

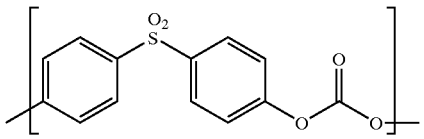

V

5. A method according to claim 1 wherein said solvent comprises from about 10 to about 99 percent by weight of said solution.

6. A method according to claim 1 wherein said solvent comprises at least one ester substituted phenol having structure VI

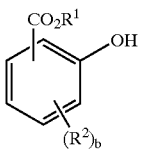

VI wherein
R$^1$ is a C$_1$–C$_{20}$ alkyl group, C$_4$–C$_{20}$ cycloalkyl group, or C$_4$–C$_{20}$ aryl group;
R$^2$ is independently at each occurrence a halogen atom, cyano group, nitro group, C$_1$–C$_{20}$ alkyl group, C$_4$–C$_{20}$ cycloalkyl group, C$_4$–C$_{20}$ aryl group, C$_1$–C$_{20}$ alkoxy group, C$_4$–C$_{20}$ cycloalkoxy group, C$_4$–C$_{20}$ aryloxy group, C$_1$–C$_{20}$ alkylthio group, C$_4$–C$_{20}$ cycloalkylthio group, C$_4$–C$_{20}$ arylthio group, C$_1$–C$_{20}$ alkylsulfinyl group, C$_4$–C$_{20}$ cycloalkylsulfinyl group, C$_4$–C$_{20}$ arylsulfinyl group, C$_1$–C$_{20}$ alkylsulfonyl group, C$_4$–C$_{20}$ cycloalkylsulfonyl group, C$_4$–C$_{20}$ arylsulfonyl group, C$_1$–C$_{20}$ alkoxycarbonyl group, C$_4$–C$_{20}$ cycloalkoxycarbonyl group, C$_4$–C$_{20}$ aryloxycarbonyl group, C$_2$–C$_{60}$ alkylamino group, C$_6$–C$_{60}$ cycloalkylamino group, C$_5$–C$_{60}$ arylamino group, C$_1$–C$_{40}$ alkylaminocarbonyl group, C$_4$–C$_{40}$ cycloalkylaminocarbonyl group, C$_4$–C$_{40}$ arylaminocarbonyl group, or C$_1$–C$_{20}$ acylamino group; and b is an integer 0–4.

7. A method according to claim 6 wherein said solvent further comprises a halogenated aromatic solvent, a halogenated aliphatic solvent, a non-halogenated aromatic solvent, a non-halogenated aliphatic solvent, or a mixture thereof.

8. A method according to claim 1 wherein said solvent comprises methyl salicylate.

9. A method according to claim 8 wherein said solvent further comprises ortho-dichlorobenzene.

10. A method according to claim 1 wherein said transesterification catalyst comprises a quaternary ammonium compound, a quaternary phosphonium compound, or a mixture thereof.

11. A method according to claim 10 wherein said quaternary ammonium compound has structure VII

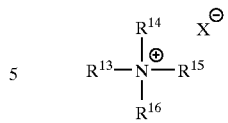

VII wherein R$^{13}$–R$^{16}$ are independently a C$_1$-C$_{20}$ alkyl group, C$_4$-C$_{20}$ cycloalkyl group, or a C$_4$-C$_{20}$ aryl group; and X$^-$ is an organic or inorganic anion.

12. A method according to claim 11 wherein said anion is selected from the group consisting of hydroxide, halide, carboxylate, phenoxide, sulfonate, sulfate, carbonate, and bicarbonate.

13. A method according to claim 11 wherein said quaternary ammonium compound is tetramethylammonium hydroxide.

14. A method according to claim 10 wherein said phosphonium compound has structure VIII

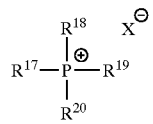

VIII wherein R$^{17}$–R$^{20}$ are independently a C$_1$-C$_{20}$ alkyl group, C$_4$-C$_{20}$ cycloalkyl group, or a C$_4$-C$_{20}$ aryl group; and X$^-$ is an organic or inorganic anion.

15. A method according to claim 14 wherein said anion is selected from the group consisting of hydroxide, halide, carboxylate, phenoxide sulfonate, sulfate, carbonate, and bicarbonate.

16. A method according to claim 14 wherein said quaternary phosphonium compound is tetrabutylphosphonium acetate.

17. A method according to claim 10 wherein said transesterification catalyst further comprises at least one alkali metal hydroxide, alkaline earth hydroxide, or mixture thereof.

18. A method according to claim 1 wherein said transesterification catalyst comprises at least one alkali metal hydroxide, at least one alkaline earth hydroxide, or mixture thereof.

19. A method according to claim 18 wherein said alkali metal hydroxide is sodium hydroxide.

20. A method according to claim 1 wherein said transesterification catalyst comprises at least one alkali metal salt of a carboxylic acid, alkaline earth salt of a carboxylic acid, or a mixture thereof.

21. A method according to claim 20 in which said alkali metal salt of a carboxylic acid is Na$_2$Mg EDTA.

22. A method according to claim 1 wherein said transesterification catalyst comprises at least one salt of a non-volatile inorganic acid.

23. A method according to claim 22 wherein said salt of a non-volatile acid is at least one salt selected from the group consisting of NaH$_2$PO$_3$, NaH$_2$PO$_4$, Na$_2$HPO$_4$, KH$_2$PO$_4$, CsH$_2$PO$_4$, Cs$_2$HPO$_4$, NaKHPO$_4$, NaCsHPO$_4$, and KCsHPO$_4$.

24. A method according to claim 1 wherein said transesterification catalyst is present in an amount corresponding to between about 1.0×10$^{-8}$ and about 1×10$^{-3}$ moles of transesterification catalyst per mole of polycarbonate repeat units derived from aromatic dihydroxy compound present in the oligomeric polycarbonate.

25. A method according to claim 1 wherein said solution further comprises a monofunctional phenol chainstopper.

26. A method according to claim 25 wherein said chainstopper is p-cumylphenol.

27. A method according to claim 1 wherein said extruder has a screw speed, said solution being introduced into said extruder at a feed rate, said feed rate and said screw speed having a ratio, said extruder being operated such that the ratio of feed rate in pounds per hour to the screw speed expressed in revolutions per minute falls within a range of from about 0.01 to about 100.

28. A method according to claim 27 wherein the screw speed is in a range between about 50 and about 1200 revolutions per minute.

29. A method according to claim 27 wherein said extruder is equipped with at least one vacuum vent.

30. A method according to claim 27 wherein said extruder is selected from the group consisting of a co-rotating intermeshing double screw extruder, a counter-rotating non-intermeshing double screw extruder; a single screw reciprocating extruder, and a single screw non-reciprocating extruder.

31. A method according to claim 1 further comprising the steps of

Step (A) heating the solution comprising the solvent and the oligomeric polycarbonate to a temperature greater than the boiling point of said solvent, said boiling point being the boiling point of said solvent at atmospheric pressure, said heating being carried out at a pressure greater than atmospheric pressure to provide a superheated mixture of oligomeric polycarbonate and solvent; and Step (B) introducing said superheated mixture of oligomeric polycarbonate and solvent into the extruder through at least one pressure control valve.

32. A method according to claim 31 wherein said extruder is selected from the group consisting of a co-rotating intermeshing double screw extruder, a counter-rotating non-intermeshing double screw extruder, a single screw reciprocating extruder, and a single screw non-reciprocating extruder.

33. A method according to claim 31 wherein said extruder is equipped with at least one vacuum vent and optionally one or more vents operated at about atmospheric pressure, said extruder being equipped with at least one side feeder, said side feeder being equipped with at least one vent, said vent being operated at atmospheric pressure.

34. A method according to claim 33 wherein said extruder is selected from the group consisting of a co-rotating, intermeshing double screw extruder; a counter-rotating, non-intermeshing double screw extruder; a single screw reciprocating extruder, and a single screw non-reciprocating extruder.

35. A method according to claim 1 further comprising removing a product polycarbonate from said extruder.

36. A method according to claim 35 wherein said product polycarbonate is introduced into a second extruder, said second extruder comprising at least one vacuum vent, said second extruder being operated at a temperature in a range between about 100° C. and about 400° C., and a screw speed in a range between about 50 rpm and about 1200 rpm.

37. A method according to claim 36 wherein said second extruder is selected from the group consisting of a co-rotating intermeshing double screw extruder, a counter-rotating non-intermeshing double screw extruder, a single screw reciprocating extruder, and a single screw non-reciprocating extruder.

38. A method for preparing polycarbonate, said method comprising:

Step (I) heating a mixture comprising at least one dihydroxy aromatic compound, an ester substituted diaryl carbonate and a transesterification catalyst at a temperature in a range between about 100° C. and about 300° C. to provide a solution of an oligomeric polycarbonate in an ester substituted phenol solvent; and Step (II) extruding said solution of oligomeric polycarbonate in said ester substituted phenol at one or more temperatures in a range between about 100° C. and about 400° C., and at one or more screw speeds in a range between about 50 and about 1200 rpm, said extruding being carried out on an extruder comprising at least one vent adapted for solvent removal.

39. A method corresponding to claim 38 wherein in Step (I) the ester substituted diaryl carbonate is employed in an amount corresponding to between about 0.95 and about 1.05 moles per mole of said dihydroxy aromatic compound.

40. A method according to claim 38 wherein said transesterification catalyst is present in an amount corresponding to between about $1.0 \times 10^{-8}$ and about $1 \times 10^{-3}$ moles of transesterification catalyst per mole of said dihydroxy aromatic compound.

41. A method according to claim 38 wherein said ester-substituted diaryl carbonate has structure IX

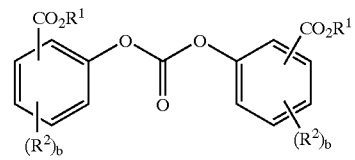

IX wherein $R^1$ is independently at each occurrence $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is independently at each occurrence an integer 0–4.

42. A method according to claim 41 wherein said ester substituted diaryl carbonate is bis(methyl salicyl)carbonate.

43. A method according to claim 38 wherein said dihydroxy aromatic compound has structure X

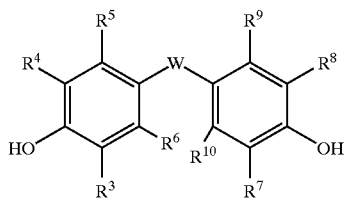

wherein $R^3$–$R^{10}$ are independently a hydrogen atom, halogen atom, nitro group, cyano group, $C_1$–$C_{20}$ alkyl group, $C_4$–$C_{20}$ cycloalkyl group, or $C_6$–$C_{20}$ aryl group; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

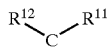

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

44. A method according to claim 38 wherein said at least one dihydroxy aromatic compound comprises hydroquinone and bisphenol A.

45. A product polycarbonate prepared by the method of claim 44.

46. A molded article comprising the polycarbonate of claim 45.

47. A method according to claim 38 wherein said at least one dihydroxy aromatic compound comprises bisphenol A and 4,4'-sulfonyldiphenol.

48. A product polycarbonate prepared by the method of claim 47.

49. A molded article comprising the polycarbonate of claim 48.

50. A method for preparing polycarbonate, said method comprising:

Step (I) heating a mixture of bisphenol A, bis(methyl salicyl)carbonate and a transesterification catalyst at a temperature in a range between 100° C. and 300° C. a pressure between about 0.1 and about 10 atmospheres to provide a solution of an oligomeric bisphenol A polycarbonate in methyl salicylate, said bis(methyl salicyl)carbonate being present in an amount corresponding to between about 0.95 and about 1.05 moles bis(methyl salicyl)carbonate per mole bisphenol A, said transesterification catalyst being present in an amount corresponding to between $1 \times 10^{-8}$ and $1 \times 10^{-3}$ moles transesterification catalyst per mole bisphenol A, said oligomeric polycarbonate comprising methoxy carbonyl phenoxy terminal groups; and Step (II) extruding said solution of oligomeric bisphenol A polycarbonate in methyl salicylate at one or more temperatures in a range between about 100° C. and about 400° C., and at one or more screw seeds in a range between about 50 and about 1200 rpm.

51. A method according to claim 50 wherein the transesterification catalyst comprises tetrabutylphosphonium acetate.

52. A polycarbonate prepared by the method of claim 50, said polycarbonate comprising less than 10 ppm Fries product.

53. A polycarbonate according to claim 50, said polycarbonate having a percent endcapping of about at least 90 percent.

54. A polycarbonate according to claim 50, said polycarbonate having a percent endcapping of about at least 97 percent.

55. A molded article comprising the polycarbonate of claim 50.

56. A molded article according to claim 55 which is an optical disk.

57. A method for the preparation of polycarbonate, said method comprising extruding in the presence of a transesterification catalyst at one or more temperatures in a temperature range between about 100° C. and about 400° C. a solution comprising a solvent and a polycarbonate, said extruding being carried out on an extruder equipped with at least one vent adapted for solvent removal, said polycarbonate comprising polycarbonate repeat units derived from at least one dihydroxy aromatic compound, said polycarbonate comprising ester substituted phenoxy terminal groups having structure I

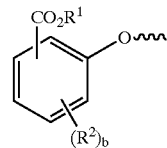

wherein $R^1$ is a $C_1$–$C_{20}$ alkyl group, $C_4$–$C_{20}$ cycloalkyl group, or $C_4$–$C_{20}$ aryl group;

$R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

58. A method according to claim 57 wherein said polycarbonate has a number average molecular weight of at least 5000 daltons.

* * * * *